United States Patent
Tran

(10) Patent No.: US 11,770,357 B2
(45) Date of Patent: *Sep. 26, 2023

(54) MULTI-BLOCKCHAIN PROOF-OF-ACTIVITY PLATFORM

(71) Applicant: PEER INC, Bellevue, WA (US)

(72) Inventor: Thinh Tran, Renton, WA (US)

(73) Assignee: PEER INC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/895,923

(22) Filed: Aug. 25, 2022

(65) Prior Publication Data
US 2022/0417203 A1 Dec. 29, 2022

Related U.S. Application Data

(63) Continuation of application No. 17/131,405, filed on Dec. 22, 2020, now Pat. No. 11,463,397, which is a (Continued)

(51) Int. Cl.
| | |
|---|---|
| *H04L 67/104* | (2022.01) |
| *G06F 3/04817* | (2022.01) |
| *G06F 3/0485* | (2022.01) |
| *G06Q 50/00* | (2012.01) |
| *H04L 9/00* | (2022.01) |
| *H04L 51/52* | (2022.01) |
| *G06Q 20/06* | (2012.01) |

(Continued)

(52) U.S. Cl.
CPC ......... *H04L 51/52* (2022.05); *G06Q 20/0658* (2013.01); *G06Q 20/3672* (2013.01); *H04L 9/0643* (2013.01); *H04L 65/4046* (2013.01); *H04L 67/1044* (2013.01); *G06F 3/0485* (2013.01); *G06F 3/04817* (2013.01); *G06Q 50/01* (2013.01); *H04L 9/50* (2022.05)

(58) Field of Classification Search
CPC ..... H04L 9/40; H04L 9/32; H04L 9/08; H04L 29/06; G06F 16/23; H04W 76/11; H04W 8/08; H04W 84/20

See application file for complete search history.

(56) References Cited

U.S. PATENT DOCUMENTS

| | | |
|---|---|---|
| 5,581,670 A | 12/1996 | Bier et al. |
| 8,793,579 B2 | 7/2014 | Halliday et al. |

(Continued)

OTHER PUBLICATIONS

Rathbone, "Windows 7 for Dummies," 2009, Wiley Publishing, Inc.
(Continued)

*Primary Examiner* — Iqbal Zaidi
(74) *Attorney, Agent, or Firm* — Seed IP Law Group LLP

(57) ABSTRACT

A method for real-time multiparty communications across a social network organized according to a fluid timeline is taught. In the method, a user accesses the social network. The user views a story posted by a first user and favorably reacted to by a second user. The user also likes the story, so the user favorably reacts to the posted story. Since a threshold number of users have favorably reacted to the posted story, a collective network group messaging feature is made available. The user accesses the feature participates in real time in a collective network group messaging session in a virtual room with at least one other user.

17 Claims, 29 Drawing Sheets

Related U.S. Application Data continuation of application No. PCT/US2019/039927, filed on Jun. 28, 2019.

(60) Provisional application No. 62/692,547, filed on Jun. 29, 2018.

(51) Int. Cl.
  *G06Q 20/36* (2012.01)
  *H04L 9/06* (2006.01)
  *H04L 65/403* (2022.01)

(56) References Cited

U.S. PATENT DOCUMENTS

| | | |
|---|---|---|
| 8,990,255 B2 | 3/2015 | Metsätähti et al. |
| 9,262,067 B1 | 2/2016 | Bell et al. |
| 10,755,487 B1 | 8/2020 | Snibbe |
| 2003/0095149 A1 | 5/2003 | Fredriksson et al. |
| 2004/0021673 A1 | 2/2004 | Alessi et al. |
| 2004/0125150 A1 | 7/2004 | Adcock et al. |
| 2005/0091596 A1 | 4/2005 | Anthony et al. |
| 2005/0114781 A1 | 5/2005 | Brownholtz et al. |
| 2005/0154988 A1 | 7/2005 | Proehl et al. |
| 2005/0210410 A1 | 9/2005 | Ohwa et al. |
| 2006/0284852 A1 | 12/2006 | Hofmeister et al. |
| 2007/0061748 A1 | 3/2007 | Hirose |
| 2008/0148191 A1 | 6/2008 | Weinlander |
| 2008/0163119 A1 | 7/2008 | Kim et al. |
| 2008/0294663 A1 | 11/2008 | Heinley et al. |
| 2008/0309626 A1 | 12/2008 | Westerman et al. |
| 2009/0077504 A1 | 3/2009 | Bell et al. |
| 2009/0150822 A1 | 6/2009 | Miller et al. |
| 2010/0077355 A1 | 3/2010 | Belinsky et al. |
| 2010/0095238 A1 | 4/2010 | Baudet |
| 2011/0004662 A1 | 1/2011 | Dodsworth |
| 2011/0179368 A1 | 7/2011 | King et al. |
| 2011/0285636 A1 | 11/2011 | Howard et al. |
| 2013/0024803 A1 | 1/2013 | Workman et al. |
| 2013/0073984 A1 | 3/2013 | Lessin et al. |
| 2013/0157234 A1 | 6/2013 | Gulli et al. |
| 2013/0290430 A1 | 10/2013 | Yung et al. |
| 2014/0013243 A1 | 1/2014 | Flynn, III et al. |
| 2014/0040379 A1 | 2/2014 | Sittig et al. |
| 2014/0089816 A1 | 3/2014 | DiPersia et al. |
| 2014/0108139 A1 | 4/2014 | Weinstein et al. |
| 2014/0324797 A1 | 10/2014 | Yung et al. |
| 2015/0120766 A1 | 4/2015 | Hamilton et al. |
| 2015/0220264 A1 | 8/2015 | Lewis et al. |
| 2015/0378556 A1 | 12/2015 | Ramanathan et al. |
| 2016/0274785 A1 | 9/2016 | Tolia et al. |
| 2016/0364085 A1 | 12/2016 | Henderson et al. |
| 2017/0041296 A1 | 2/2017 | Ford et al. |
| 2017/0161439 A1 | 6/2017 | Raduchel et al. |
| 2017/0169800 A1 | 6/2017 | Greco et al. |
| 2017/0220215 A1 | 8/2017 | Wu et al. |
| 2017/0232300 A1 | 8/2017 | Tran et al. |
| 2017/0256003 A1 | 9/2017 | Isaacson et al. |
| 2017/0359288 A1 | 12/2017 | Golan |
| 2018/0359089 A1* | 12/2018 | Innes ............... G06F 16/25 |
| 2019/0123580 A1* | 4/2019 | Bindea ............ H02J 13/00028 |
| 2019/0147017 A1 | 5/2019 | Tran |
| 2019/0377778 A1 | 12/2019 | Tran |
| 2020/0359550 A1* | 11/2020 | Tran ................. H04L 9/0643 |
| 2021/0042854 A1 | 2/2021 | Hazy et al. |

OTHER PUBLICATIONS

"CircleSpin Cursors," Jan. 31, 2010, http://www.rw-designer.com/cursor-set/circlespin.

TouchMousePointer, May 6, 2015, https://web.archive.org/web/20140406014333/https://www.lovesummertrue.com/touchmousepointer/en-us/.

\* cited by examiner

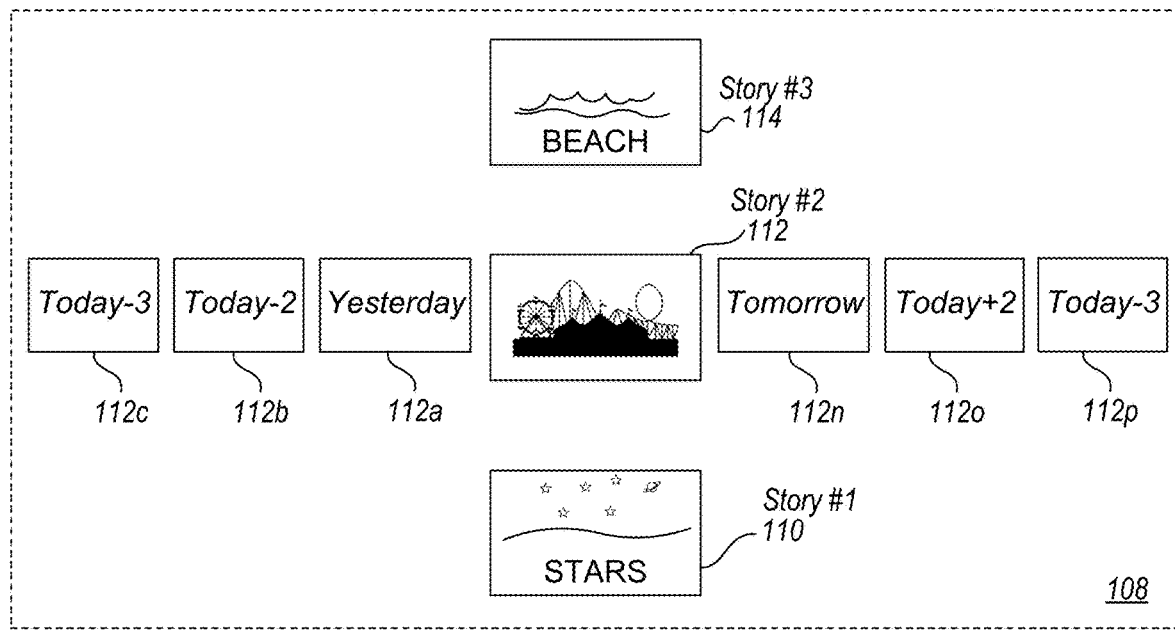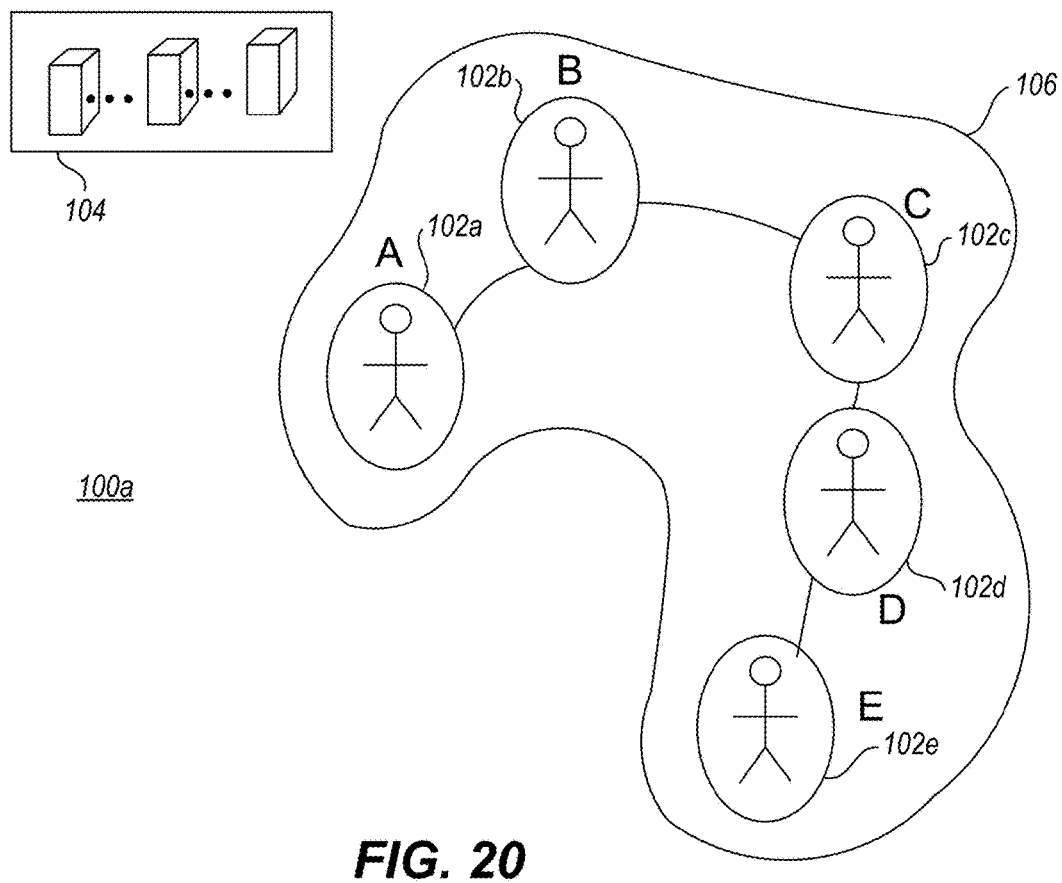
FIG. 20

MULTI-BLOCKCHAIN PROOF-OF-ACTIVITY PLATFORM

BACKGROUND

Technical Field

The present disclosure describes an improved computing network platform (i.e., an "ecosystem") that facilitates a network of social, personal, professional, and other communicative relationships. More particularly, but not exclusively, the present disclosure is directed toward a computing network platform based on distributed ledger technology (DLT) wherein the creation, value, or creation and value of tokens is derived based on proof-of-activity within the computing network platform.

Description of the Related Art

Social networking is a prominent form of communication for millions of people across the world. There are many network-based software programs that facilitate human connection and collaboration in specific contexts. These programs (i.e., collections of one or more software applications) are commonly known as social networks.

Social networks, as the term is often used, provide many types of human and device interaction. In addition to the facilitation of purely "social" connectivity, social networks are used in business, academia, and government, These entities communicate with each other and with any number of huma users (e.g., customers, clients, purchasers, consumers, employees, employers, patients, students, inmates, and the like).

Conventionally, social networks comprise substantial bodies of software resident on remote computing servers that cooperate with one or more other software programs resident on a user's local computing device (e.g., laptop, tablet, smartphone, wearable computing device, or other mobile device, Internet of Things (IoT) device, desktop, set top box, kiosk, and the like). The remote software may operate on one computing server, however in many cases, the remote software is distributed across a plurality of computing servers. The local software may include software programs dedicated to the social networking functionality and in addition, or in the alternative, the local software may include shared software programs such as Internet browsers, networking programs, storage programs, multimedia programs, and the like.

Social networking features are generally delivered using particular communication tool programs and interaction tool programs that operate across the Internet. Communication tool programs, or communication tools, allow users to communicate with text, sound, still or moving images, or the like. The communication tools allow users to self-expressively capture, store, present, and deliver various forms of communication. Interaction tool programs provide the software mechanisms that allow two or more users to communicate. Together, these tools facilitate both loosely and tightly organized collaborations between people.

Within a social network, address books, contact lists, and the like can be dynamically created, grown, shrunk, deleted, or otherwise curated by users to group one or more other users in a wide variety of ways. The social network distinguish each user from other users based on a unique number, an email address, or some other means, and in this way a set of such means can be organized into a group. Members of the group may be known as "buddies," "friends," "members," "connections," or by some other term.

Known social networks provide users with access to a wide variety of software applications, many of which are dedicated to providing specific functionality to enhance relationships amongst users. Instant messaging applications, for example, allow one user to communicate with another user over a network in near real time. In these cases, one user can attempt to contact another user in by entering the person's email address, phone number, messenger ID, or the like. If the contacted user is online and available, the instant messaging software application program will activate some form of a chat window. The chat window includes space for each user to write to the other user, as well as read the other user's reply. Some forms the instant messaging programs allow many users to join and communicate with many other users at the same time in virtual "chat rooms." In these cases, the flow of users may be in reasonably constant flux as users enter and leave the chat room at will.

Other software applications provided by certain known social network service providers include software tools that let users post pictures, videos, audio, text, emoticons, status indicators, and the like. These software tools, or corresponding software tools, let other users access the content posted. Generally, a user that posts such information is permitted to control which other users are allowed to access the posted content.

All of the subject matter discussed in the Background section is not necessarily prior art and should not be assumed to be prior art merely as a result of its discussion in the Background section. Along these lines, any recognition of problems in the prior art discussed in the Background section or associated with such subject matter should not be treated as prior art unless expressly stated to be prior art. Instead, the discussion of any subject matter in the Background section should be treated as part of the inventor's approach to the particular problem, which in and of itself may also be inventive.

BRIEF SUMMARY

In embodiments described herein, systems, devices, and methods for real-time multiparty communications across a social network platform organized according to a fluid timeline are taught. The social network platform is screen-agnostic and comprises a bundle distributed applications administered by a blockchain operating system. In some embodiments, the distributed applications share a common graphic user interface (GUI), which in the present disclosure is referred to as a primary portal.

In these and other embodiments, the multi-blockchain proof-of-activity platform provides each user with a means of becoming a merchant of their own data. Users generate and provide content into the network, and this provable activity is captured using distributed ledger (i.e., blockchain) algorithms. In this way, using "keys" or another privacy mechanism, each user can "own" their data as the source that either permits or restricts access to the data. Within this system, in at least some embodiments, provable activity on the network can be used to generate "coins" or some other such tokens that may be used as currency within the network. These coins may also be referred to herein as utility tokens.

In at least some embodiments, the common graphic user interface GUI (i.e., the primary portal) operates as a multi-purpose, screen agnostic navigation/selection (NavSel) device that is utilized to interface with a multi-axial (e.g., bi-axial, tri-axial) navigation pattern on a screen. Rather than manipulating a conventional human input device (i.e., mouse, trackball, touchpad) to point at and select screen objects of interest, it is the environment behind the NavSel that is moved. More specifically, the environment communicated to the presentation interface (e.g., display, tactile device, or other sensory device) has the illusion of movement while the NavSel pattern remains stationary or moves only within a confined region. In at least one embodiment, when the user is horizontally "scrolling" a timeline, the NavSel pattern may appear to spin or otherwise indicate motion. In at least some of these or other embodiments, the motion (e.g., rotation) of the NavSel pattern may be directional (e.g., counter-clockwise for motion back in time and clockwise for motion forward in time).

In at least some embodiments, the common GUI is a visual system that receives tracking input and translates the tracking input to present, select, or present and select menus, commands, and other user input. The tracking input may be provided by traditional human interface devices (HID) such as touch screens, computer mice, trackballs, and the like. The tracking input may also be provided by novel machine vision devices, electromagnetic devices, infrared devices, ultrasound devices, accelerometer based devices, other technologies. In these systems, for example, a set of defined gestures allow users to intuitively control a multi-axial common user interface.

Based on the multi-blockchain proof-of-activity platform, in at least one embodiment, a first user accesses the social network platform and views a story posted by a second user and favorably reacted to by a third user. The first user also likes the story, so the first user favorably reacts to the posted story. Since a threshold number of users have favorably reacted to the posted story, a collective network group messaging feature is made available. The first user accesses the feature and participates in real time in a collective network group messaging session in a virtual room with at least one other user.

This Brief Summary has been provided to introduce certain concepts in a simplified form that are further described in detail below in the Detailed Description. Except where otherwise expressly stated, the Brief Summary does not identify key or essential features of the claimed subject matter, nor is it intended to limit the scope of the claimed subject matter.

BRIEF DESCRIPTION OF THE SEVERAL VIEWS OF THE DRAWINGS

Non-limiting and non-exhaustive embodiments are described with reference to the following drawings, wherein like labels refer to like parts throughout the various views unless otherwise specified. The sizes and relative positions of elements in the drawings are not necessarily drawn to scale. For example, the shapes of various elements are selected, enlarged, and positioned to improve drawing legibility. The particular shapes of the elements as drawn have been selected for ease of recognition in the drawings. One or more embodiments are described hereinafter with reference to the accompanying drawings in which:

FIG. 20 illustrates a fluid timeline social network infrastructure embodiment;

DETAILED DESCRIPTION

Figure 1:
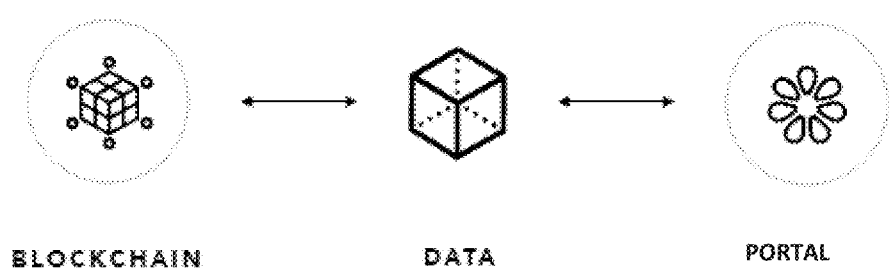
FIG. 1 represents various portions of a multi-blockchain proof-of-activity platform embodiment.

Two nascent areas of commercial activity are cryptocurrency and distributed ledger technology (DLT). Combined, they have the power to disrupt the established exchange of information and the power structures that govern this exchange. Before now, however, there has been no established platform capable of delivering the benefits of cryptocurrency and DLT on a large, dynamic scale.

More specifically, no known cryptocurrency or DLT-based applications have proven effective for daily use. Heretofore, for example, current estimates of know cryptocurrency infrastructures can only process three (3) to eight (8) transactions per second, which is in contrast to known credit card offerings, which can process one to two million transactions per second.

Today, it is estimated that over two billion people now directly access the Internet. Of these, less than one percent are estimated to even have the faintest idea of cryptocurrency markets. Hence, the current cryptocurrency and DLT systems now in use can satisfy the twenty million or so people that have a faint idea of cryptocurrency markets, but unless these systems are drastically overhauled or replaced, cryptocurrency and DLT will not compete with the existing information exchange power structures.

The multi-blockchain proof-of-activity platform described herein teaches and presents a mode to host and deliver a new generation of distributed applications and decentralized platform implementations. This platform is constructed around the concept of time. Even though time is the oldest first-principle concept, all known mainstream technologies only provide the experience of time in pieces. People share the "past" on social networks, plan the "future" on digital calendars, and track the "present" via any number of instant messaging communication platforms. Individually, many of these applications are highly efficient, but switching between them is inefficient and often results in an undesirable disruptive user experience.

As described in the present disclosure, all known social computing networks are improved by the development of a new framework in which time, and all of a user's experiences, are aligned with a single, fluid dynamic that includes the past, present, and future. Time is a universal standard and a global pacemaker that requires little user explanation. Because of this, the fluid timeline concepts upon which the multi-blockchain proof-of-activity platform rests permit the creation of an abundance of user intuitive applications.

Some or all of the data entered into the distributed applications built on the multi-blockchain proof-of-activity platform can be wrapped with DLT structures such as blockchain. Blockchain, for example, provides immutable properties to data that can be utilized in conjunction with cryptocurrencies to transact. By using the fluid timeline as a container for categories of data alongside other user interface elements, the multi-blockchain proof-of-activity platform described herein can deliver services to any number of markets regardless of device and geography. What's more, the delivery of these services can be within any regulatory framework or no regulatory framework at all.

FIG. 1 represents various portions of a multi-blockchain proof-of-activity platform 200 embodiment. The platform is implemented as a peer-to-peer interaction and transactions framework arranged as a distributed social mesh. Data, such as user generated content (UGC), can be securely stored in a distributed files system (e.g., IPFS) and selectively shared or not shared by the data owner. Communication between parties can take place in real time or nearly so; limited almost exclusively by the communication medium itself. The communication speed is improved over current systems because time to execute transactions is greatly reduced. As represented in FIG. 1, UGC and other data is passed through a portal. The data is added to or retrieved from a blockchain by nodes of the distributed social mesh. Individual users and their data collectively function within a single universal free-market across time, and every user is empowered as a merchant of their own data.

The data passed into the platform is separated from the platform and managed by private blockchains. This permits data to be freely moved at speed using any underlying computing technologies at the physical level. Above the physical level, the multi-blockchain proof-of-activity platform provides a time-based protocol secure transfer layer and data model, which delivers a unified and verifiable experience for all users.

Several aspects of the multi-blockchain proof-of-activity platform are now described.

First, with the multi-blockchain proof-of-activity platform, the data of each user is represented in a personal blockchain of unrestricted length. The personal blockchain (PBC) is anchored by a master chain, which gives each user full control of their data while cross-chain smart contracts can create verifiable programmable interfaces (VPI) between peers. Each smart contract in this respect can be arranged as a contract that includes offer, acceptance, consideration, and other elements of an enforceable transaction. In some embodiments, the personal blockchain may be comprised of any number of associated personal blockchains (i.e., multiple blockchains, multi-blockchains).

Next, the multi-blockchain proof-of-activity platform is arranged with a defined utility token, which can be used as a measure of value, like a currency, within the multi-blockchain proof-of-activity platform. A useful currency acts as a medium of exchange, a unit of account, and a store of value. While some known cryptocurrencies initially excel, they soon fail because they cannot act as an underlying store of value or unit of account. The utility tokens of the multi-blockchain proof-of-activity platform are sustainable because they are geared towards infinite scalable transactions which both power the multi-blockchain proof-of-activity platform and reward uses for their participation in the distributed framework.

Outside of digital networks, in the physical world, gold possesses intrinsic value and its utility as a medium of exchange have made it the best known store of value for centuries. Unlike other goods of value (e.g., diamonds), gold is durable, divisible and combinable. Also, gold is homogeneous; every ounce is the same as every other, which cannot be said for seashells, furs, cigarettes, and birthday cakes. And the gold supply is finite, but scarce, unlike sand or grain, and still newly discoverable.

Within a digital network, the essence of time possesses intrinsic utility comparable to gold. Time is immutable; once passed, it cannot be changed, and time is divisible into accepted standards of measure (e.g., millennia, centuries, decades, years, hours, minutes, seconds and the like). Time is also homogenous; each unit is the same, and time is individually scarce; each of us has less time with each passing moment. Time, however, when embodied as a measure of value is an improvement over gold because time can be expressed digitally throughout a distributed supply.

Along these lines, the native utility token created within the multi-blockchain proof-of-activity platform is imbued with a stored intrinsic value derived from activities and time. As a result, the utility token's basic value cannot be inflated, and the blockchain described herein can be used to enforce the scarcity and immutability of distributed time to drive a value exchange ecosystem. The utility token is designed to anchor, measure, and fairly reward human capital in the distributed digital framework of the multi-blockchain proof-of-activity platform.

Utility token miners in the multi-blockchain proof-of-activity platform are stochastically chosen across the network. These miners earn utility tokens by any number of techniques (e.g., recognizing one or more images, solving a puzzle, or the like) arranged to validate human interaction. These techniques help an underlying computing resource (e.g., a processor) verify a data transaction and add it to the public ledger. In this way, the multi-blockchain proof-of-activity platform combines a proof-of-stake and work (i.e., proof-of-activity) to create an activity cost function that governs an economic layer that gives every user a fair chance to earn utility tokens within the network.

The multi-blockchain proof-of-activity platform implements an atomic commit protocol that ensures transactions are started and completed. The atomic commit protocol may in some cases be implemented as off-chain payment channels linked by smart-contracts to ensure that transactions between any two instances of a blockchain will always be processed immediately, regardless of the size of the network or the value size.

In the multi-blockchain proof-of-activity platform, certain computing resources may be defined as helper resources. These helper resources operate as the equivalent of network nodes. Helper resources can be called on to verify transactions within the multi-blockchain proof-of-activity platform, and they can also be called on to verify activities in the real world. In at least some embodiments, a helper resource protocol requires the node's acceptance. In at least some embodiments, a helper resource protocol is bounded by a smart-contract. In at least some embodiments, a helper resource protocol is defined with a plurality of levels (e.g., three, seven, nine, eleven, or some other number) of helper resources, wherein each level is determined by stake and activities.

The multi-blockchain proof-of-activity platform also implements, in at least some cases, a defined handshake protocol. The handshake protocol can be applied for a real world. Also, in the peer-to-peer exchange of physical goods. Within the defined handshake protocol, safety is ensured when users meet face-to-face in the real world for any kind of goods exchange.

A primary portal, as the term is used herein, comprises a common graphical user interface (GUI) that is defined in at least some embodiments of the present disclosure. Non-graphical, and even non-visual, primary portals are considered by the inventors, but for simplicity in the present portion of the disclosure, a primary portal is described in context of a visually presented GUI. In many ways, the primary portal may be understood as a global distributed operating system.

The primary portal permits a user to access the multi-blockchain proof-of-activity platform in a functional way, such as by uploading or otherwise providing text, multimedia, or other such content. Via the primary portal, users may also engage in commerce as a result of their participation in the platform. For example, users may receive a utility token, a portion of a utility token, one utility token, or a plurality of utility tokens in exchange for providing user generated content (UGC). The primary portal further permits users to set preferences, establish their digital identity, perceive the content of others (e.g., view, hear, read, tactically feel, or the like), or participate with the platform in other ways. Because the multi-blockchain proof-of-activity platform is arranged around a fluid timeline, a novel real time experience is provided to help users preserve the temporal context of their data.

The primary portal is arranged as a device agnostic portal. Visually, the primary portal delivers a consistent performance on devices having any screen size (e.g., mobile phones, tablets, laptop computing devices, wearable computing devices, and the like).

In some embodiments, the primary portal includes a built-in encrypted chat feature that provides an added layer of protection for peer-to-peer communication and transactions.

One distributed application of the multi-blockchain proof-of-activity platform that is accessible and usable via the primary portal is a push application. The optional push application is embodied as a self-service or assisted service marketing and advertising platform. The push application provides advertisers, publishers, merchants, and any other emption users with a means of delivering "paid" advertisements, announcements, solicitations, and other such communications to users willing to accept such communications.

In at least one embodiment, users selectively provide access to some or all of their content in exchange or consideration, such as a portion of a utility token, one utility token, or a plurality of utility tokens. For example, in at least some cases, the push application can serve advertisements to one or more matching user profiles with an expectation of a high click through yield (e.g., one that will yield greater 50%, 75%, 90%, or some other probability of click-through). In at least some of these embodiments, the communicators that access the push application can take advantage of the fluid timeline basis of the multi-blockchain proof-of-activity platform. In this way, the push application can post advertisements to the future and automatically repeat items once physical-world time has passed the present day. These and other features improve the efficiency of delivering communications, and such efficiency gains may in some cases lower the cost for advertising programs. The push application may be used to set goals, select an audience, measure results, optimize campaigns, and perform any number of other functions.

Another distributed application of the multi-blockchain proof-of-activity platform that is accessible and usable via the primary portal is a digital purse application. The digital purse application may be particularly suited toward the accumulation and distribution of utility tokens described in the present disclosure. In this way, utility tokens may be managed for daily transactions by and between merchants and consumers, employers and employees, service providers and users contracting the services, and the like. In some embodiments, it is expected that all or nearly all distributed applications that exist and execute within the multi-blockchain proof-of-activity platform will include or otherwise have access to digital purse features.

In at least one embodiment, a last will and testament distributed application is available to users. Here, smart-contacts associated with a future event may be associated with utility tokens associated with a particular user.

In various embodiments, each utility token is given a time value. For example, one utility token may be equivalent to 365 days, where each daily unit is a sub-token. The value of utility tokens are inherently tied to the network's effect of utilization and contribution—instead of programmed scarcity that can be forked or monopolized.

The platform allows users to have an equal opportunity to earn utility tokens. In some embodiments, the initial value of the utility tokens may be set at an initial offering, where merchants, users, and others can purchase utility tokens. After the initial offering, new and unique users may be allowed to obtain new utility tokens through the utilization of the platform and the blockchain process described herein.

When a user joins the platform, the user receives an initial utility token that marks the beginning of their private blockchain. The amount of the initial utility token is equivalent to the user's age at signup. The initial utility token is then vested by the user's activity on the network. The user can obtain a new sub-token for each day they sign in to the platform. In some embodiments, the user can obtain additional tokens or sub-tokens based on an amount of activity or contribution, e.g., time, the user supplies to the network. In one example embodiment, when a user provides user generated content to the platform, that content is secured via the user's individual blockchain, as described herein. The size or amount of content added via the individual blockchain may in some embodiments determine or set the amount of tokens provided to the user. In other embodiments, a user may obtain additional tokens or sub-tokens by "liking" or commenting on another user's content, such as by adding it to their blockchain.

Again, the cryptocurrency described herein is distributed according to participation. Those that join the network and help it grow will thrive and flourish with it. It will amplify their own value, making it grow faster. The bigger the network grows, the more utility in the token exists. As the size of the network and transaction volumes within it grows, demand for the tokens also increases. In general, the scarcity of the utility tokens is tied to the value of participation instead of a stated supply. Each new participant increases the value of the network for all existing participants.

Once a user has activated or obtained a utility token (e.g., by obtaining sufficient number of sub-tokens by signing in), the user can begin to earn and transact in utility tokens. In various embodiments, the tokens may be utilized by the users to make payments for digital and physical assets sold by individual merchants associated with the platform. Tokens can also be used as commission paid to platform nodes for processing transactions and smart contracts; stakes deposited by nodes to be eligible to validate certain transactions; payment for services provided by applications built on the platform; payment for storing data securely in a decentralized way; payment for registering blockchain-based time names; payment for creating advertisements and other services pushed to users;

As described herein, advertisers and publisher can deliver information to users willing to accept such information. To accommodate this willingness, users can indicate that they are willing to accept utility tokens in exchange for receiving information from advertisers and publishers. In some embodiments, the users may set this willingness amount. In other embodiments, the platform may set the willingness amount based on one or more factors, e.g., the type of information provided to the users, the number of users receiving the information, the age or profile of the users, etc. The advertisers and publishers can buy utility tokens from the platform using other currencies (whether physical or digital) and provide them to the users in exchange for providing information to the users.

As a result, users are rewarded for their participation and time in the network, while also providing the users control over their information and the information they receive.

The initial utility tokens may expire following one or more events. In various embodiments, utility tokens are systematically burned or removed as users exit or leave the platform. For example, initial utility tokens may be deleted after threshold number of consecutive days of inactivity by the user (e.g., 60 days) or the user deletes their account. In various embodiments, the initial utility tokens may be deleted after the user's death (e.g., after a certificate or confirmation by a family member or estate executor).

Figure 2:
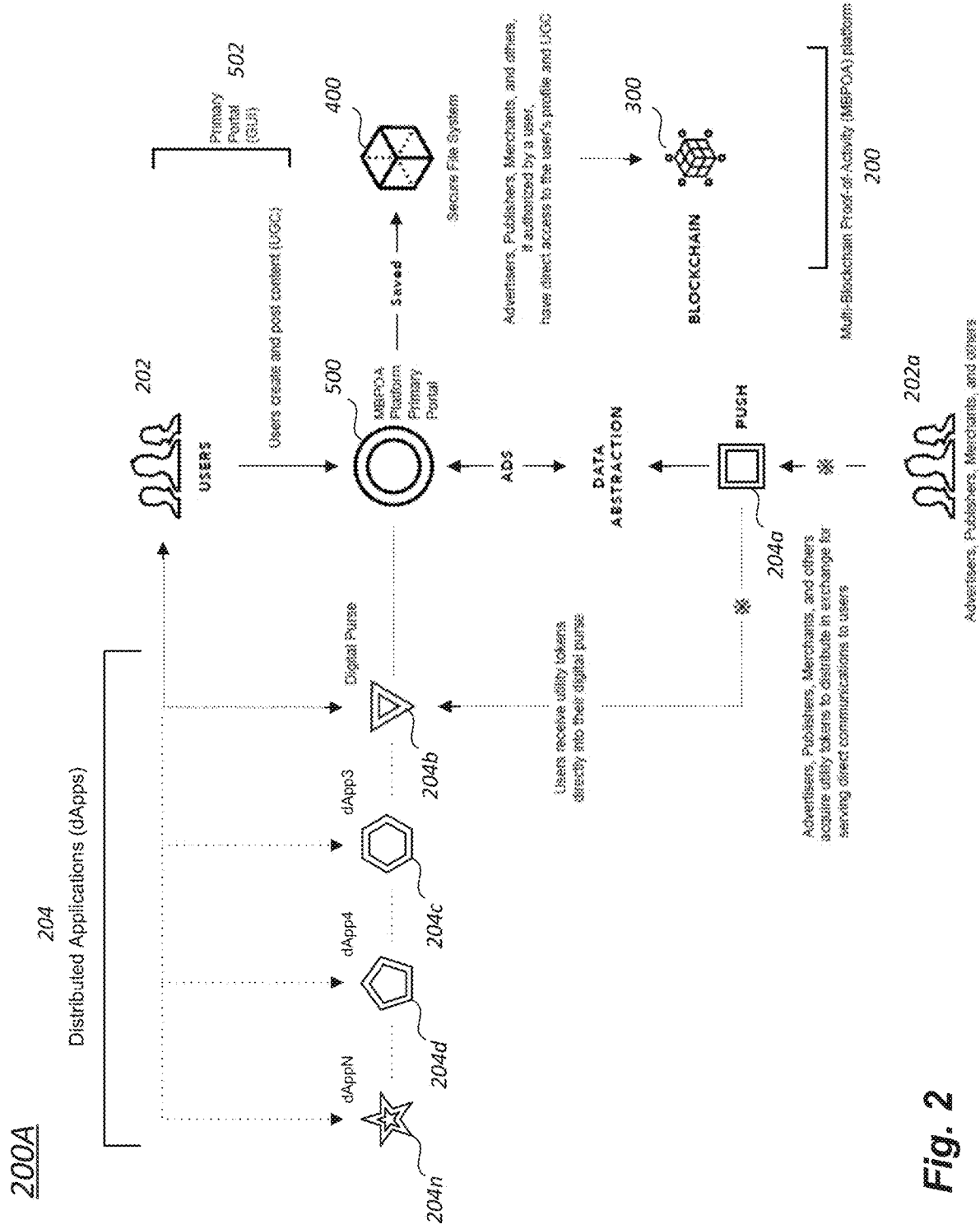
FIG. 2 is a multi-blockchain proof-of-activity platform (MBPOA) data flow embodiment.

FIG. 2 is a multi-blockchain proof-of-activity platform (MBPOA) data flow embodiment 200A. Elements of the MBPOA platform 200 include at least a blockchain engine 300, a secure file system 400, and a primary portal 500. Any number of distributed applications (dApps) 204 are also included and available to information provision/consumption users 202 of the MBPOA platform 200. The information provision/consumption users 202 access the MBPOA platform 200, including the dApps 204, via one or more primary portal interface clients 502. In FIG. 2, a push application 204a and a digital purse 204b are shown. Other distributed applications include dApp3 204c, dApp4 204d, and dAppN 204n. These other applications may include marketplace applications where any type of goods and services are exchanged, government services, education services, business-to-business applications, security applications, restaurant or other food service applications, news applications, entertainment (e.g., movies, television, sports, etc.) applications, travel (e.g., lodging, air, rail, automotive, city, suburban, rural, etc.) applications, employment applications, private applications, commercial and residential real estate applications, publishing applications, corporate applications, and many other types of distributed applications.

Considering the flow of information data in FIG. 2, information provision/consumption users 202 engage with the logic modules of the MBPOA platform 200 via any number of primary portal interface clients 502. Any number of which may be a graphical user interfaces (GUIs), but it is recognized that a primary portal interface client 502 is not limited to a GUI.

Via the primary portal interface client 502, an information provision/consumption user 202 communicates any type of information into the MBPOA platform 200. The information is considered to be user generated content (UGC). The UGC may be text, audio, video, still images, or any other type of information that can be represented digitally (i.e., as a set of defined electronic "bits"). The information is passed through a primary portal 500, secured via addition to a user's individual blockchain via blockchain engine 300, and stored in a secure file system 400.

The blockchain engine 300 is a logic module that administers a personal blockchain of unrestricted length for each registered user of the MBPOA platform 200. The personal blockchain (PBC) of each user is anchored by a master chain, and each user is provided with full control of their data. As discussed herein, cross-chain smart contracts are used establish verifiable programmable interfaces (VPI) between peers and others. In this way, a user can provide or restrict access to any information that is communicated into the MBPOA platform 200. What's more, in at least some embodiments, the blockchain engine 300 permits finely granular access to each user's information using a public key/private key infrastructure that permits multiple public keys, segmented public keys, semi-private keys, or some other architecture.

One distributed application identified in the multi-blockchain proof-of-activity platform (MBPOA) data flow embodiment 200A of FIG. 2 is a push application 204a. The push application 204a includes one or more logic modules that facilitate communication by and between certain users of the MBPOA platform 200. For example, one class of users of the MBPOA platform 200 include advertisers, publishers, merchants, and others, which may be referred to as information emption users 202a, who have a desire to access the content of information provision/consumption users 202.

The information emption users 202a interact with the push application 204a to cross a data abstraction layer into the primary portal 500. Utility tokens are acquired by the information emption users 202a and exchanged for the privilege of serving direct communications to information provision/consumption users 202. In return for granting access to their data, information provision/consumption users 202 receive utility tokens or portions thereof directly into their digital purse 204b. The digital purse 204b is administered by the MBPOA platform 200 as a distributed application.

Figure 3:
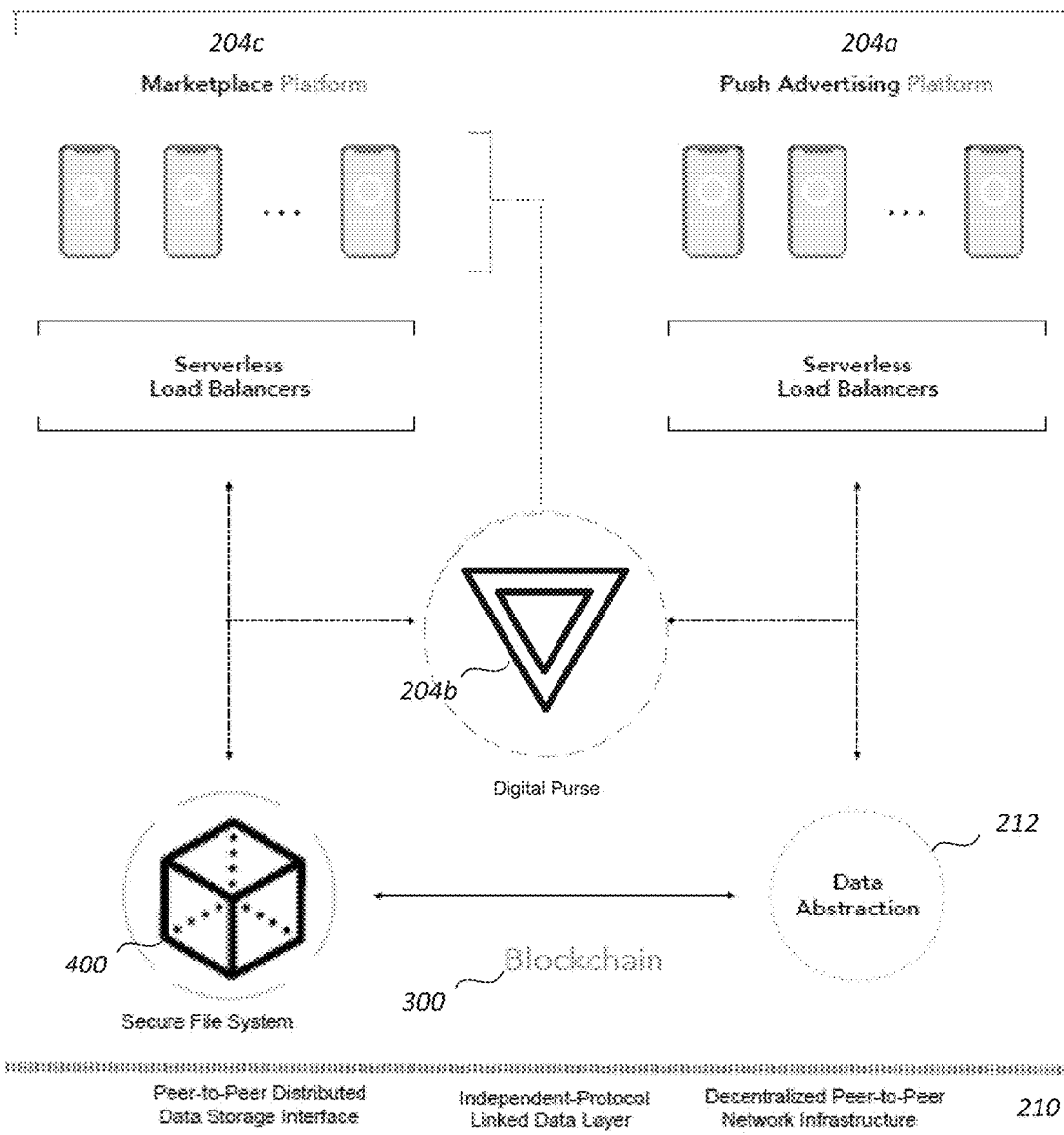
FIG. 3 is another MBPOA data flow embodiment.

FIG. 3 is another MBPOA data flow embodiment 200B. The MBPOA data flow embodiment 200B illustrates a virtual separation (e.g., an abstraction layer 210) between activities of information provision/consumption users 202 and information emption users 202a. Along these lines, the abstraction layer 210 virtually separates the set of MBPOA platform user-centric services 206 and the set of MBPOA platform data-centric services.

The MBPOA platform user-centric services 206 include any number of distributed applications 204, which provide services to, for, or to and for information provision/consumption users 202. In FIG. 3, a first distributed application (dApp) is a push application 204a, a second dApp is a digital purse 204b, and in this embodiment, a third dApp is a marketplace application 204c. The dApps are accessed via any number of computing devices that are either permanently or temporarily associated with information provision/consumption users 202.

The MBPOA platform 200 includes load balancing functions to enable smooth, time-sensitive, transactions. In this way, information provision/consumption users 202 perceive real-time, near-real-time, or some other acceptable level of computing delay when interacting with the MBPOA platform 200. In the embodiment of FIG. 3, the load balancing functions are implemented with serverless load balancing technology. As known in the art, serverless technology includes a distributed computing architecture wherein the administrator of the distributed computing network (e.g., the "cloud") dynamically manages the computing machine resources based on real-time demand.

Within the MBPOA platform 200, information that is provided by and retrieved for information provision/consumption users 202 is stored in any number of blockchain structures, which structures are administered by the blockchain engine 300. The actual data is stored in a secure file system 400. In some cases, the secure file system 400 is organized as an interplanetary file system (IPFS).

In some embodiments, the interaction between the MBPOA platform user-centric services 206 and the MBPOA platform data-centric services 208 is managed by a data abstraction module 212. The data abstraction module 210 uses any number of services to bridge the data abstraction layer 210. This architecture provides for an even more secure data model. While the information of each user is protected by a personal blockchain, the data is even further abstracted from any other human and non-human actors via the computing systems and devices that implement the data abstraction layer 210.

In some cases, a plurality of particular tools, modules, logic, and other computing structures and resources implement the data abstraction layer 210. In the embodiment of FIG. 3, a peer-to-peer distributed data storage interface is included, a protocol-independent linked data layer is included, and a decentralized peer-to-peer network infrastructure is included. More or fewer computing resources are of course contemplated.

In at least one case, the peer-to-peer (P2P) distributed data storage interface is implemented as a P-Grid system. In these and other cases, the P2P distributed data storage interface provides a decentralized structured P2P system for distributed information management that is based on randomized algorithms and local interactions.

In at least one case, the protocol-independent linked data layer is implemented according to an IPLD data model, which provides content addressing through hashes across non-interoperable systems. Through the protocol-independent linked data layer, hash-linked data structures are treated as subsets of a unified information space, and via these links, the data content can be traversed and exploited across protocols, regardless of the underlying protocol.

And in at least one case, the decentralized peer-to-peer network infrastructure is implemented as an IP address-less ZeroNet. In this system and others, network-accessible sites communicatively available via a public key. Correspondingly, a private key held by an owner of the site restricts others from making any changes without owner participation.

FIGS. 4A to 4D are embodiments of computing device presentation screens 214 having a navigation/selection symbols (NavSel) 216.

Figure 4A:
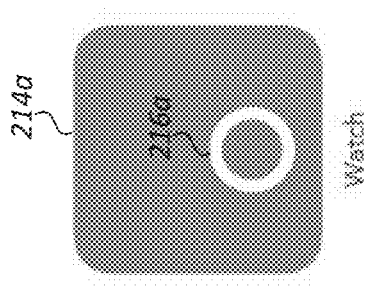
FIGS. 4A to 4D are embodiments of computing device presentation screens having a navigation/selection symbol.

In a first embodiment in FIG. 4A, a wearable computing device (e.g., a smart watch, a smart pendant, a smart bracelet, smart glasses, or the like) has a presentation screen 214a. A NavSel symbol 216a is generated and presented on the presentation screen 214a. The NavSel symbol 216a may overlay some or all other content communicated to the presentation screen 214a. In some cases, some or all of the other content communicated to the presentation screen 214a is grayed out, washed out, dimmed, or otherwise de-emphasized on the presentation screen 214a. In these cases, the NavSel symbol 216a is emphasized or otherwise arranged to cause a user's attention to be raised as to the NavSel symbol 216a.

Figure 4B:
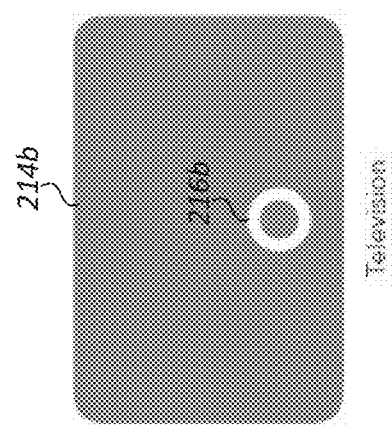

In a second embodiment in FIG. 4B, a television computing device presentation screen 214b has overlaid thereon a NavSel 216b.

Figure 4C:
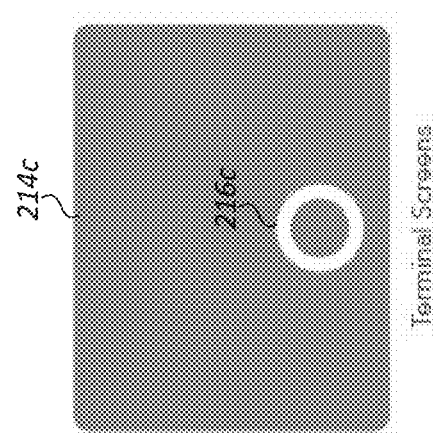

In a third embodiment in FIG. 4C, a terminal computing device presentation screen 214c has overlaid thereon a NavSel 216c.

Figure 4D:
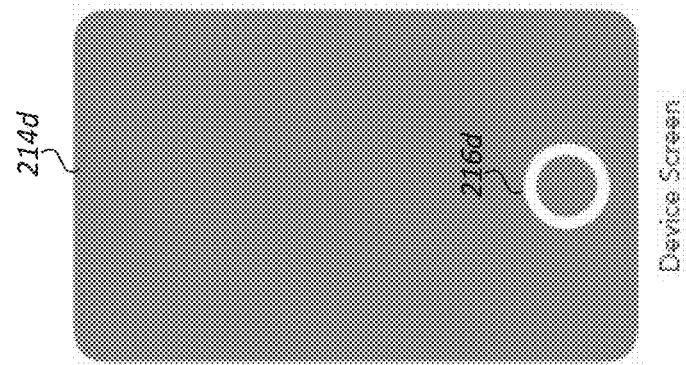

And in a fourth embodiment in FIG. 4D, some other computing device presentation screen 214d has overlaid thereon a NavSel 216d. From the embodiments of FIGS. 4A to 4D, it is apparent that a NavSel symbol may be used for any physical, virtual, logical, or another type of presentation screen. For example, a non-exclusive, non-exhaustive list of presentation screens contemplated by the inventor include e-books, tablets, smartphones, wearables, televisions, automotive dashboards, massive displays (e.g., poster-size, wall-size, billboard size, stadium size, multi-screen, and the like), non-traditional displays (e.g., dinnerware such as cups, bowls, and plates, holograms, aircraft, and the like).

Figure 5D:
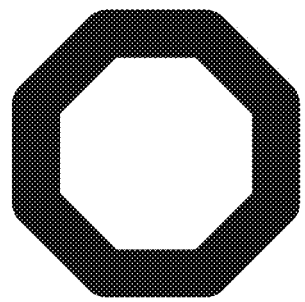
FIGS. 5A-5D are various navigation/selection symbol embodiments.
Figure 5C:
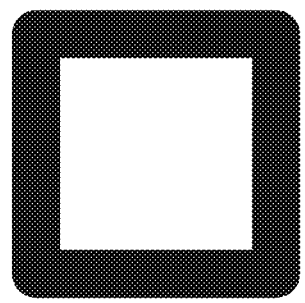
Figure 5B:
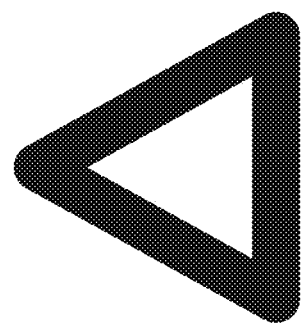
Figure 5A:
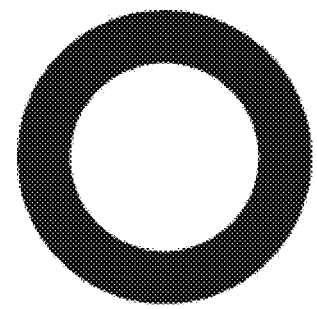

FIGS. 5A-5D are various navigation/selection (NavSel) symbol embodiments. In FIG. 5A, a NavSel symbol is represented as a circle. In FIG. 5B, a NavSel symbol is represented as a triangle. In FIG. 5C, a NavSel symbol is represented as a square. And in FIG. 5D, a NavSel symbol is represented as an octagon. The inventor has contemplated many other shapes, which are not illustrated or described so as to not obscure other aspects of the present disclosure.

Figure 6A:
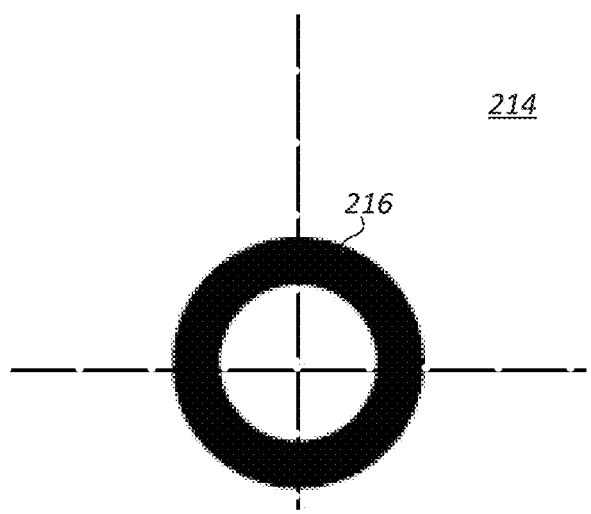
FIGS. 6A-6C are presentation screen embodiments with utilitarian navigation/selection symbol embodiments.
Figure 6B:
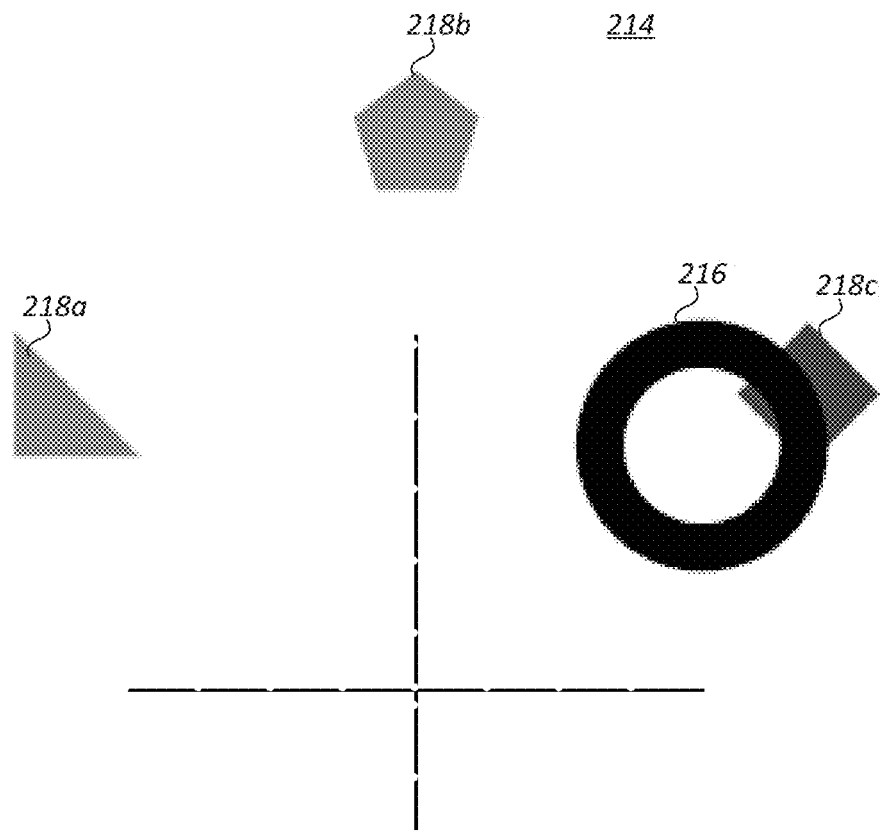
Figure 6C:
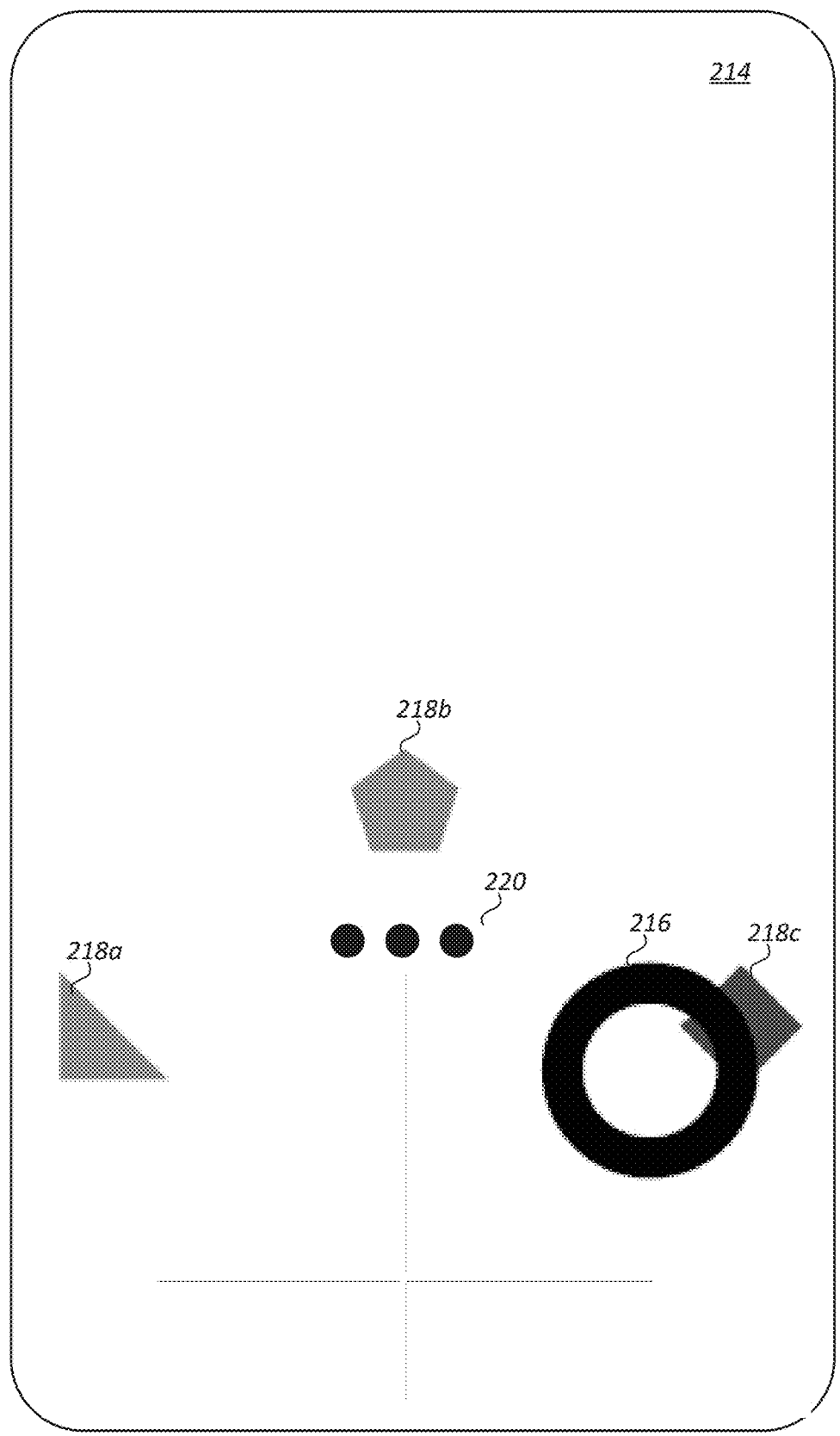

FIGS. 6A-6C are presentation screen embodiments with utilitarian navigation/selection symbol embodiments.

In FIG. 6A, a portion of presentation screen 214 represented. Horizontal and vertical axes are shown in FIG. 6A to indicate that the navigation/selection (NavSel) symbol 216 is aligned horizontally and vertically in a desirable portion of the presentation screen 214. The desirable portion of the screen may be determined by a manufacturer, systems integrator, distributor, end user, or any other person or entity. The desirable portion of the presentation screen 214 where the NavSel symbol 216 is horizontally and vertically aligned as represented in FIG. 6A is referred to herein as the origin, origin position, position or origin, or some other like term. In some embodiments, whenever the NavSel symbol 216 is displayed and not under any user or other manipulation, the NavSel symbol 216 will return to the origin position.

In many embodiments, which may include all embodiments, the horizontal and vertical axes are not presented to a user on the presentation screen 214. Instead, the axes are represented in the present disclosure only to add context and assist in understanding that the NavSel symbol 216 is desirably aligned on the presentation screen 214. In FIG. 6A, so as to simplify the drawings, no other information is shown on the presentation screen 214. It is understood, however, that in some embodiments, the NavSel symbol 216 overlies other information such as user generated content or any other information.

In FIG. 6B, the same portion of presentation screen 214 as in FIG. 6A is shown. In FIG. 6B, however, a user has caused the NavSel symbol 216 to be moved from the position or origin. The user may cause the NavSel symbol 216 to move using any particular input means. For example, when the presentation screen 214 includes a touch screen, the user may "touch and drag" the NavSel symbol 216. The NavSel symbol 216 may additionally or alternatively be moved when the computing device that hosts the presentation screen 214 includes any other means of user input (e.g., a mouse or other like human interface device (HID), haptic input, tactile input, infrared device input, ultrasound device input, electromagnetic device input, camera-based input, or any other gesture recognition input).

In FIG. 6B, a user has caused movement of the NavSel symbol 216 by some gesture input means. Once the NavSel symbol 216 is moved from its position of origin, one or more selectable user choices are presented. The one or more selectable use choices may include icons, text, menus, colors, or any other means to distinguish any different choices that the user may elect. In the embodiment shown, the user has moved the NavSel symbol 216, which causes three icons to appear 218a, 218b, 218c. In FIG. 6B, the three icons 218a, 218b, and 218c are linearly and geometrically arranged around the point of origin. It is recognized that rather than icons, any other selectable menu item may be used (e.g., text, graphics, thumbnail or other images, video clips, or the like). It is also recognized that the selectable choices presented to the user may be presented on the presentation screen 214 in any desirable way.

In the embodiment of FIG. 6B, the user has overlapped the NavSel symbol 216 onto about one third of icon 218c, which has caused a change in the presentation of icon 218c. This change, may include color, size, shape, or any other visual aspect, sound, tactile feedback, or any other perceivable change. The level of sensitivity of the NavSel symbol 216 is user selectable or changeable in another way. For example, the level of sensitivity may be changed to better or more desirably represent how near or far (i.e., how much overlap) is required before the NavSel symbol 216 is recognized as conveying a user's attempt to select that particular choice. To indicate a "selection," the overlap in some embodiments may be 10%, 15%, 25%, 75% or any other amount of overlap.

In the embodiment of FIG. 6C, movement of the NavSel symbol 216 has caused menu choice icons 218a, 218b, 218c to be presented. The movement has also caused a nested menu icon 220 to appear. The nested menu icon, which may have any desirable shape, form, or other characteristics, indicates two a user that further selectable menu choices in any particular context are available. The user may, for example, further cause the NavSel symbol 216 to move and select the nested menu icon 220.

Figure 7:
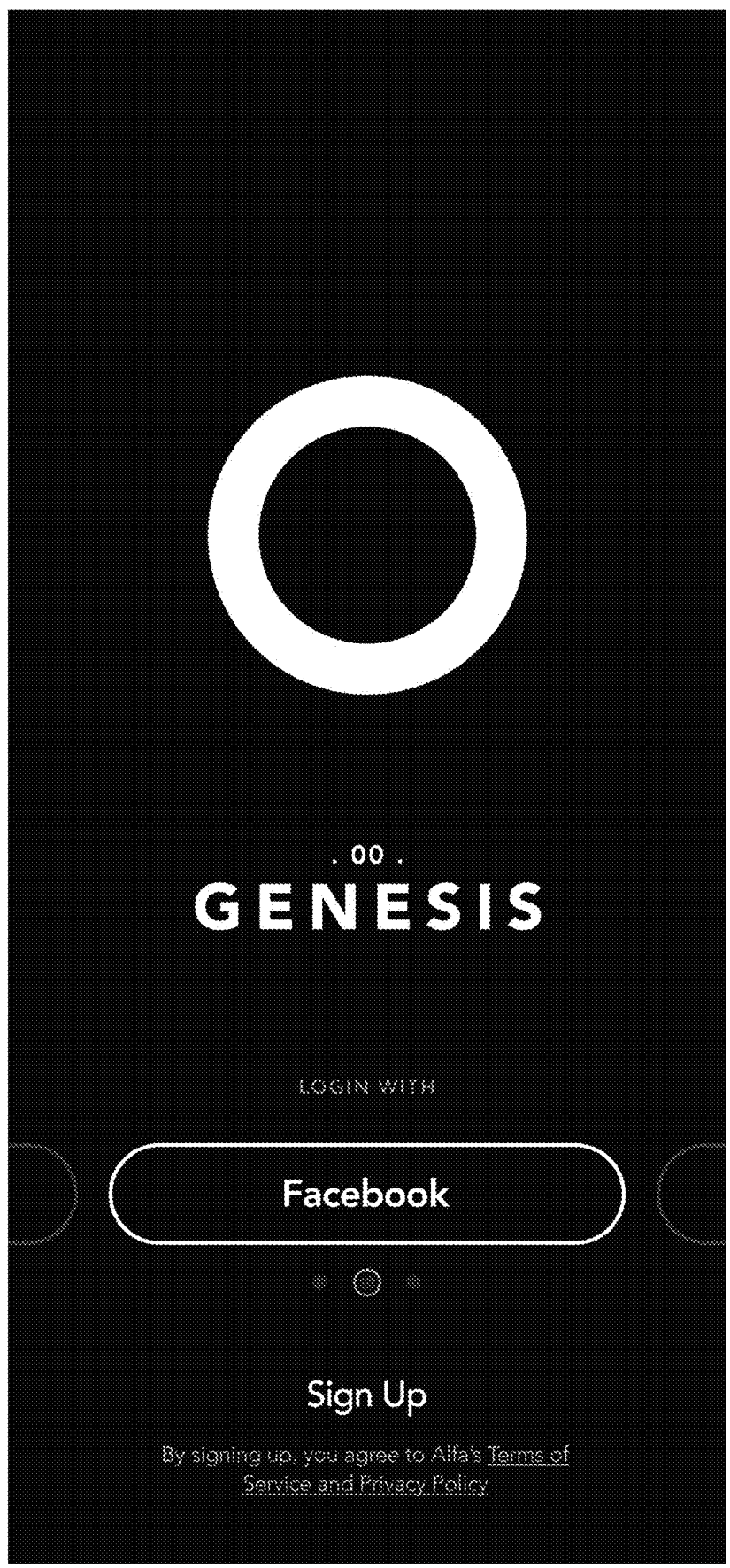
FIG. 7 is a first non-limiting representation of a computing device presentation screen that is arranged for operation as a primary portal interface client.

FIG. 7 is a first non-limiting representation of a computing device presentation screen that is arranged for operation as a primary portal interface client. In this case, the primary portal interface client is a particular graphical user interface (GUI).

Figure 8:
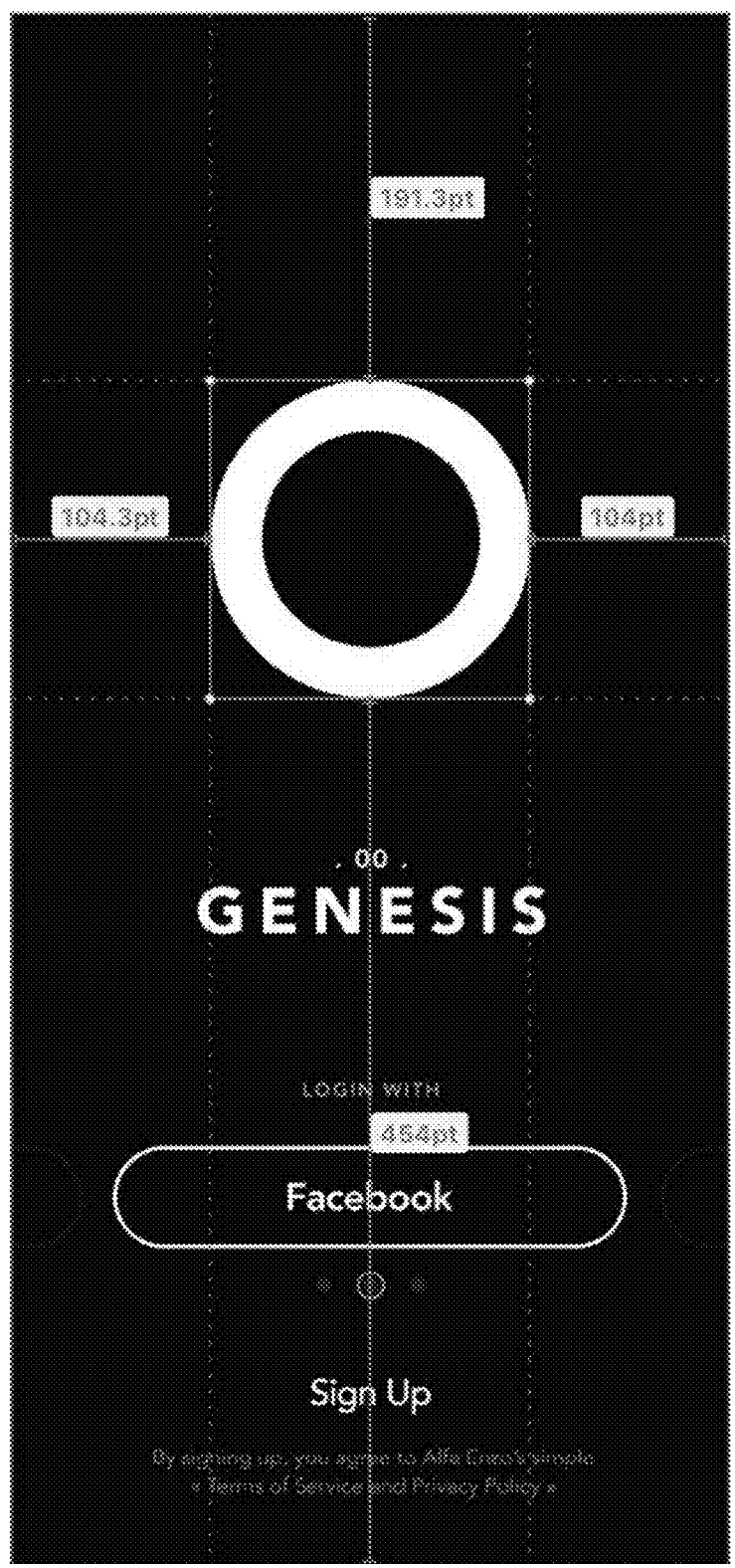
FIG. 8 is another view of the first non-limiting representation of a computing device presentation screen that is arranged for operation as a primary portal interface client.

FIG. 8 is another view of the first non-limiting representation of a computing device presentation screen that is arranged for operation as a primary portal interface client. The view of FIG. 8 identifies non-limiting size and alignment information of the first presentation screen representation of FIG. 7.

Figure 9:
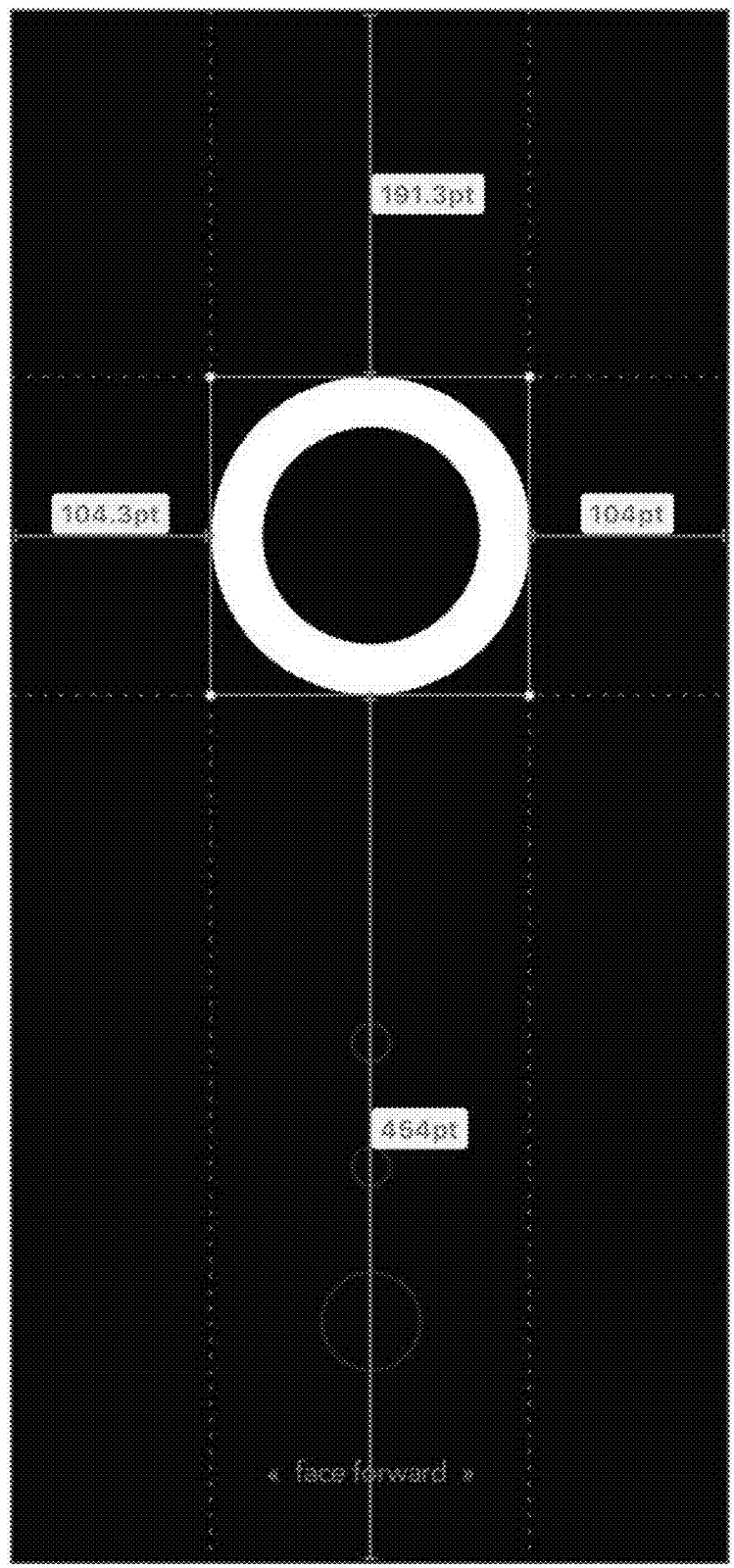
FIG. 9 is another view of the first non-limiting representation of a computing device presentation screen that is arranged for operation as a primary portal interface client.

FIG. 9 is another view of the first non-limiting representation of a computing device presentation screen that is arranged for operation as a primary portal interface client. The view of FIG. 9 identifies non-limiting size and alignment information of the first presentation screen representation of FIG. 7.

Figure 10:
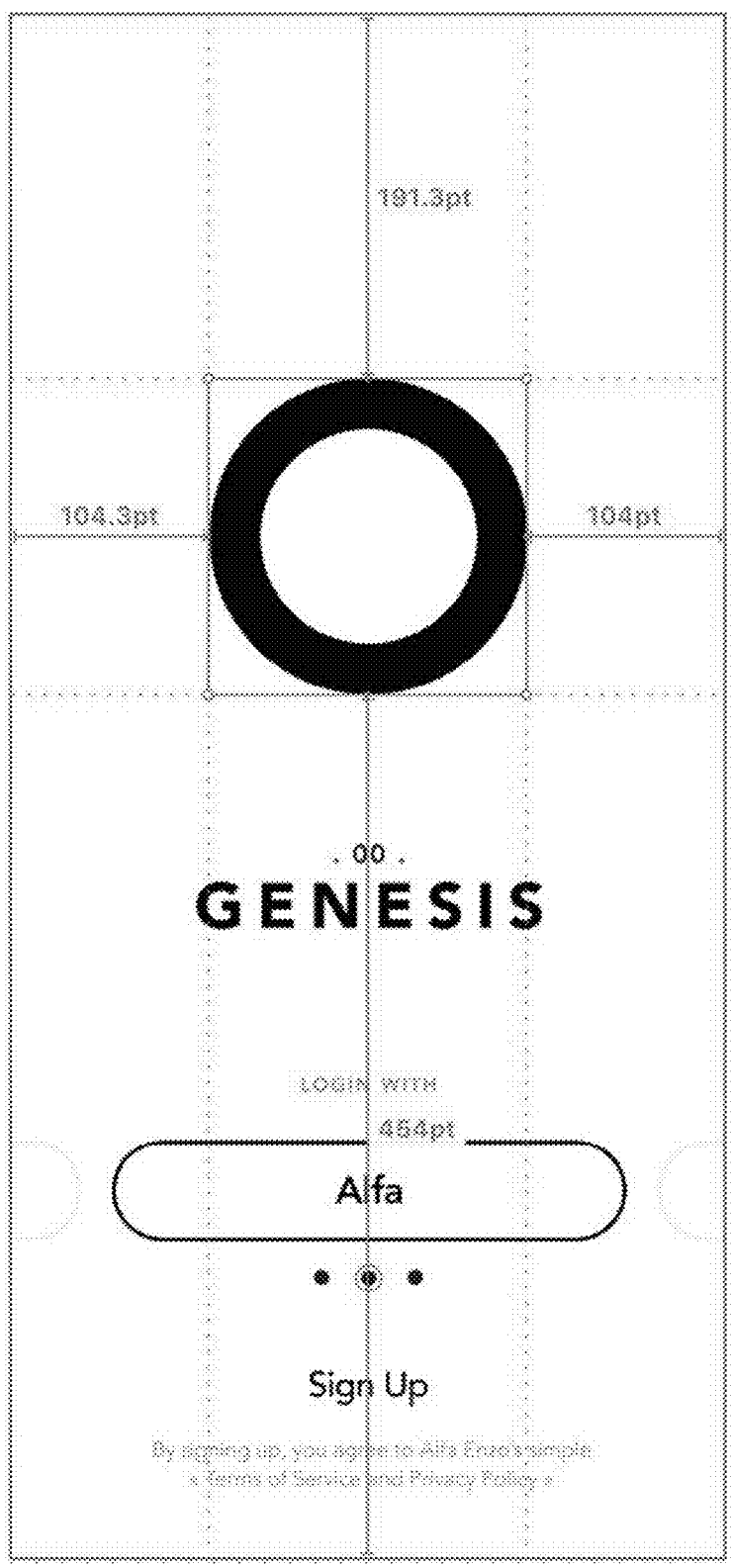
FIG. 10 is yet another view of the first non-limiting representation of a computing device presentation screen that is arranged for operation as a primary portal interface client.

FIG. 10 is yet another view of the first non-limiting representation of a computing device presentation screen that is arranged for operation as a primary portal interface client. The view of FIG. 10 is along the lines of the view of FIG. 7 with a different color scheme.

Figure 11:
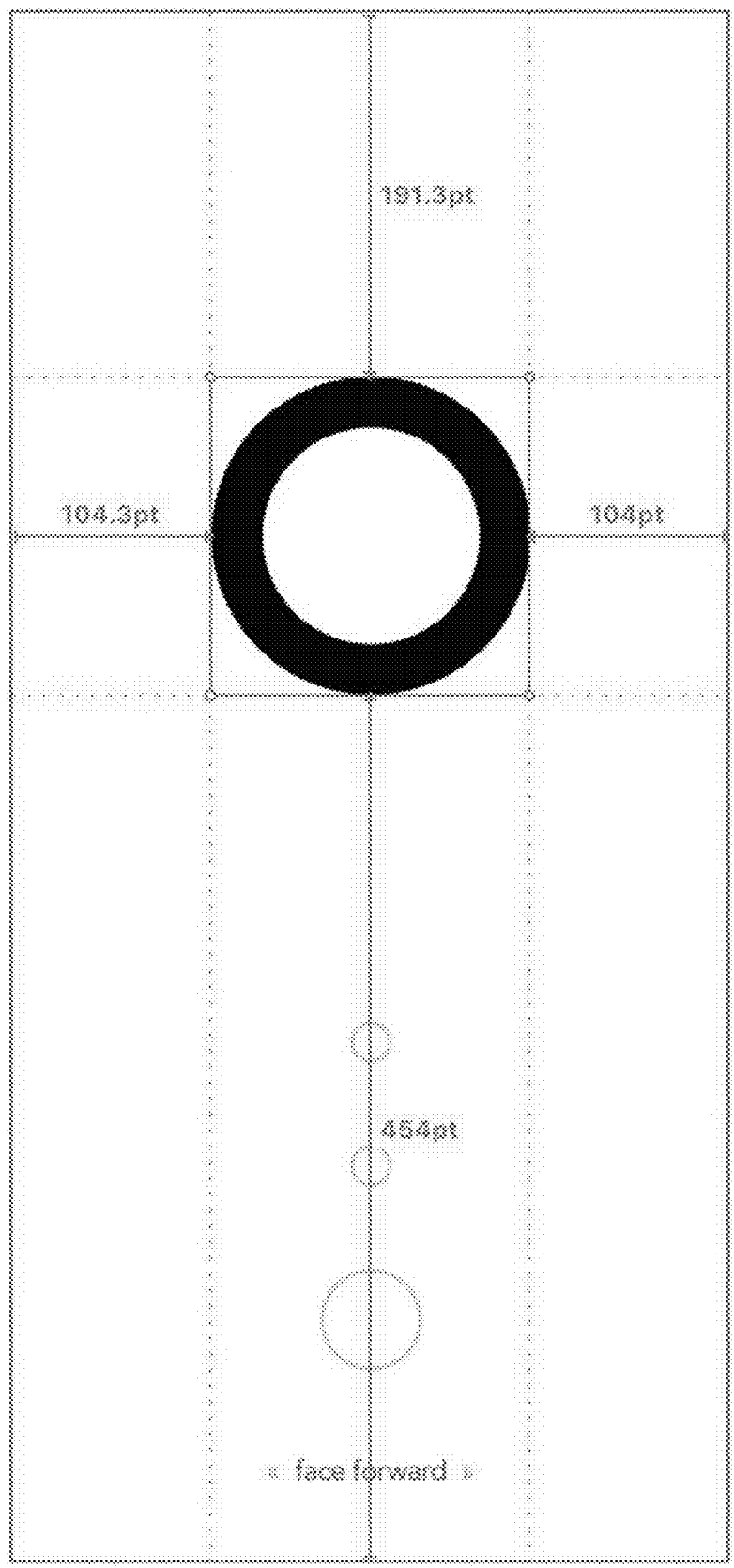
FIG. 11 is yet another view of the first non-limiting representation of a computing device presentation screen that is arranged for operation as a primary portal interface client.

FIG. 11 is yet another view of the first non-limiting representation of a computing device presentation screen that is arranged for operation as a primary portal interface client. The view of FIG. 11 is along the lines of the view of FIG. 8 with a different color scheme.

Figure 12:
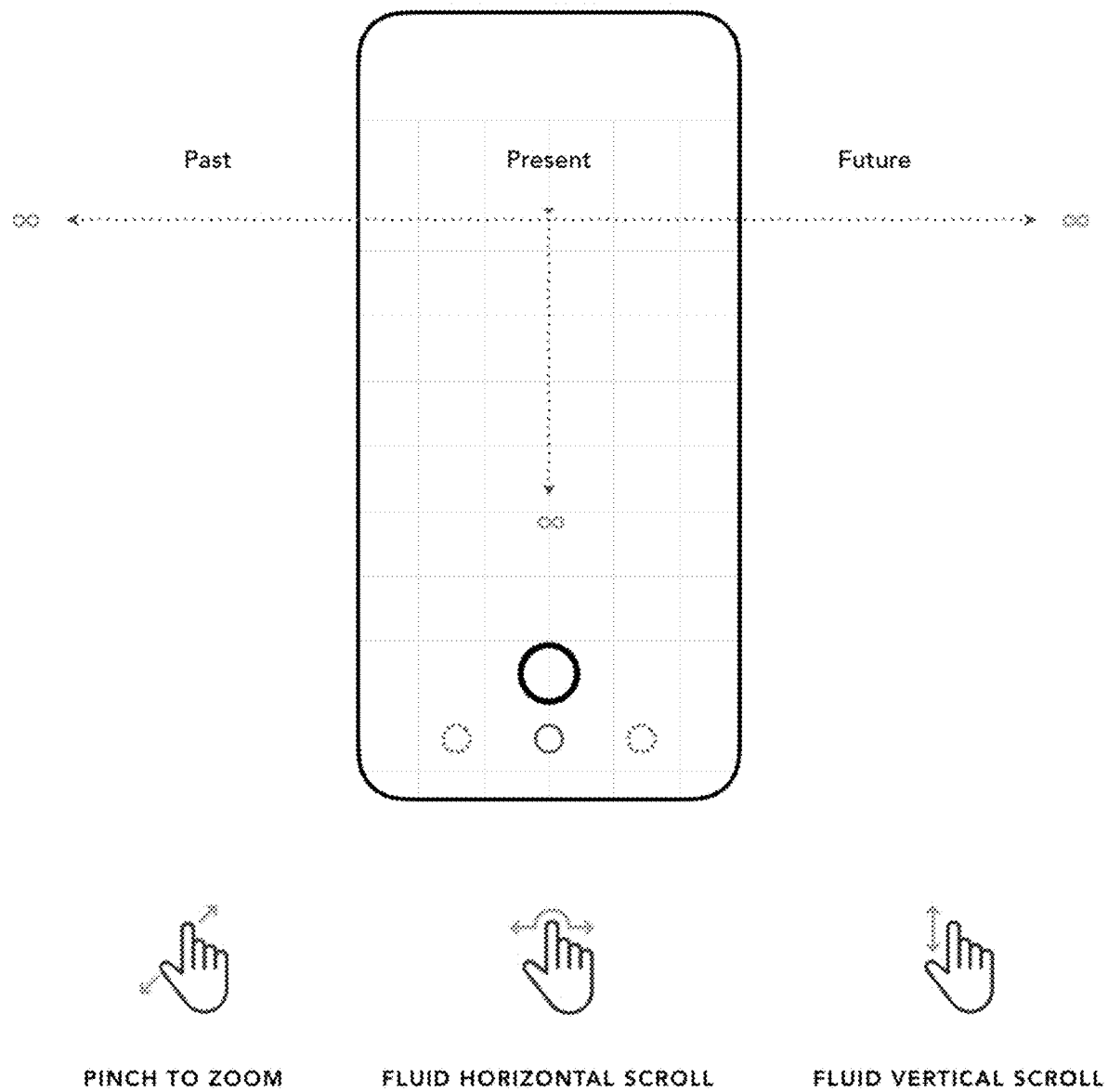
FIG. 12 is a presentation screen embodiment with teaching of several non-limiting gestures that may be employed to interact with the primary portal interface client.
Figure 13:
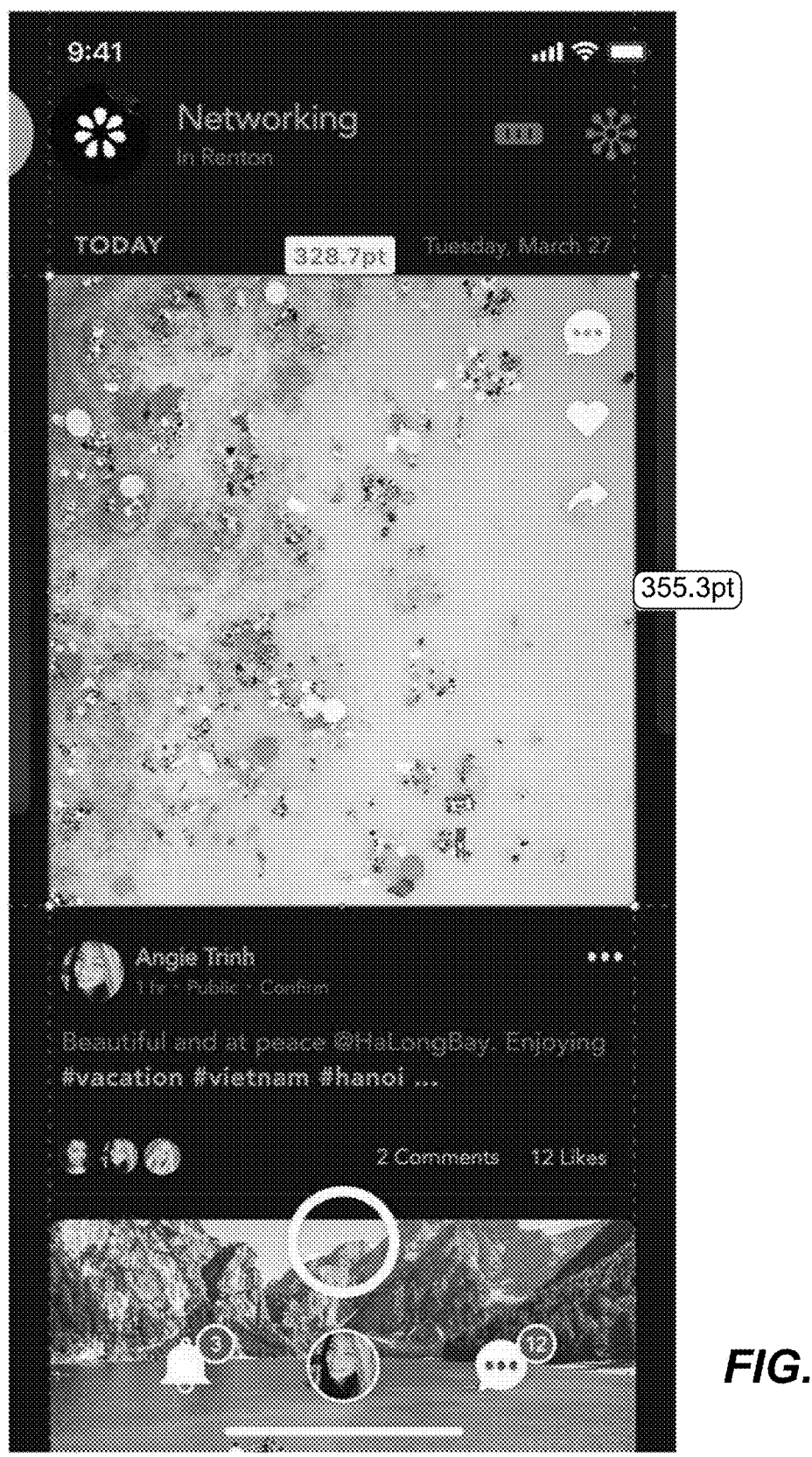
FIGS. 13, 14, 15A-15B, 16, and 17 are various presentation screen embodiments of a non-limiting primary portal interface client.
Figure 14:
Figure 15A:
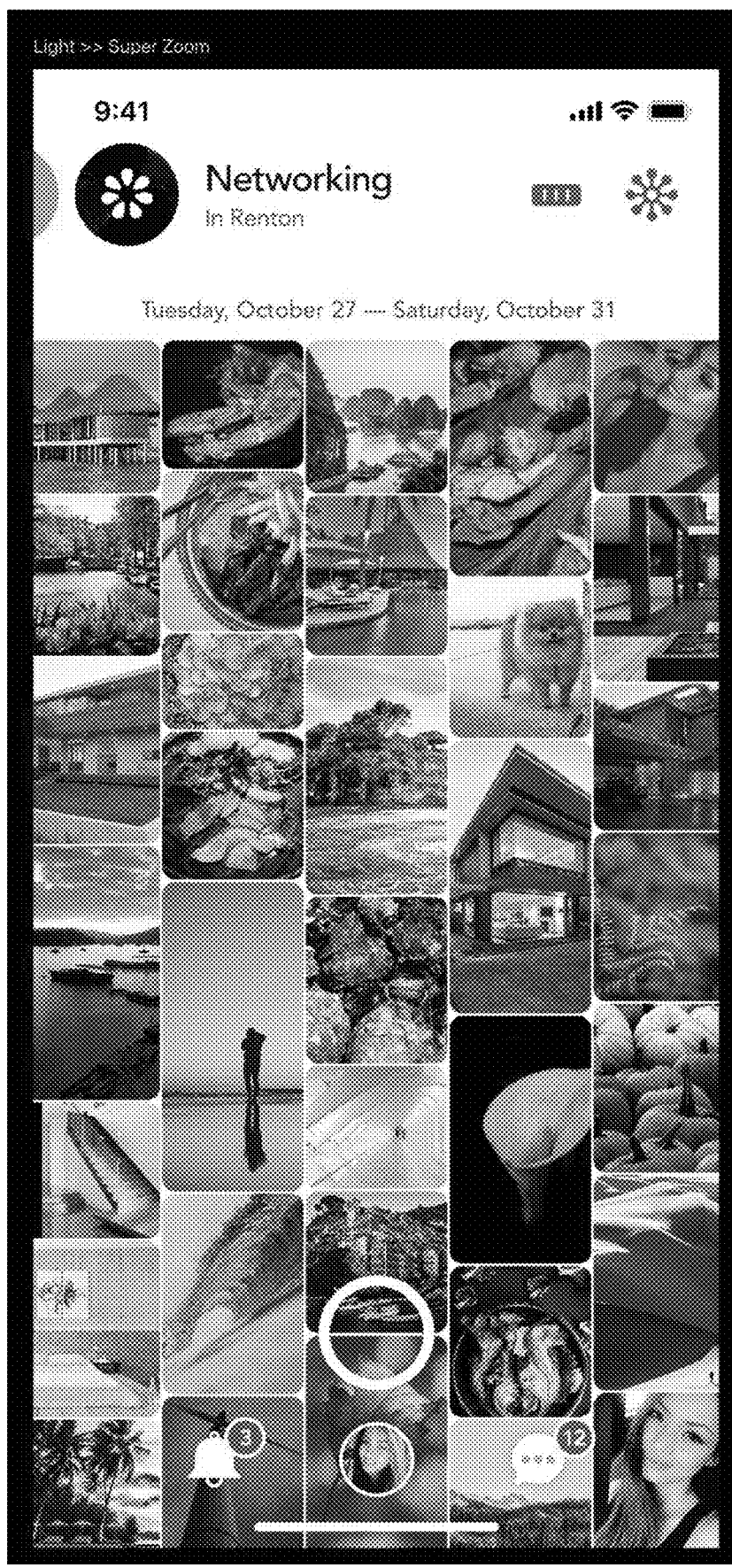
Figure 15B:
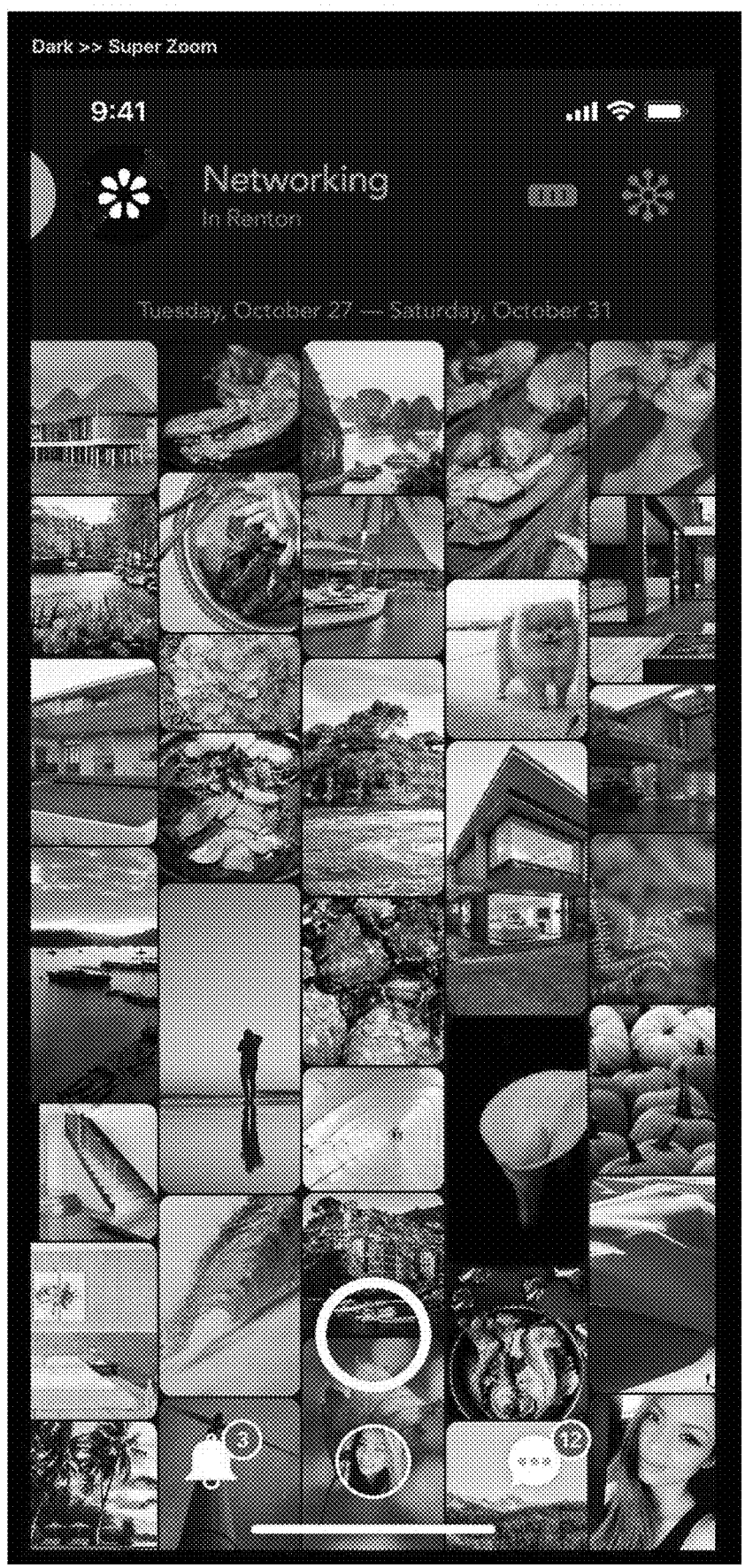
Figure 16:
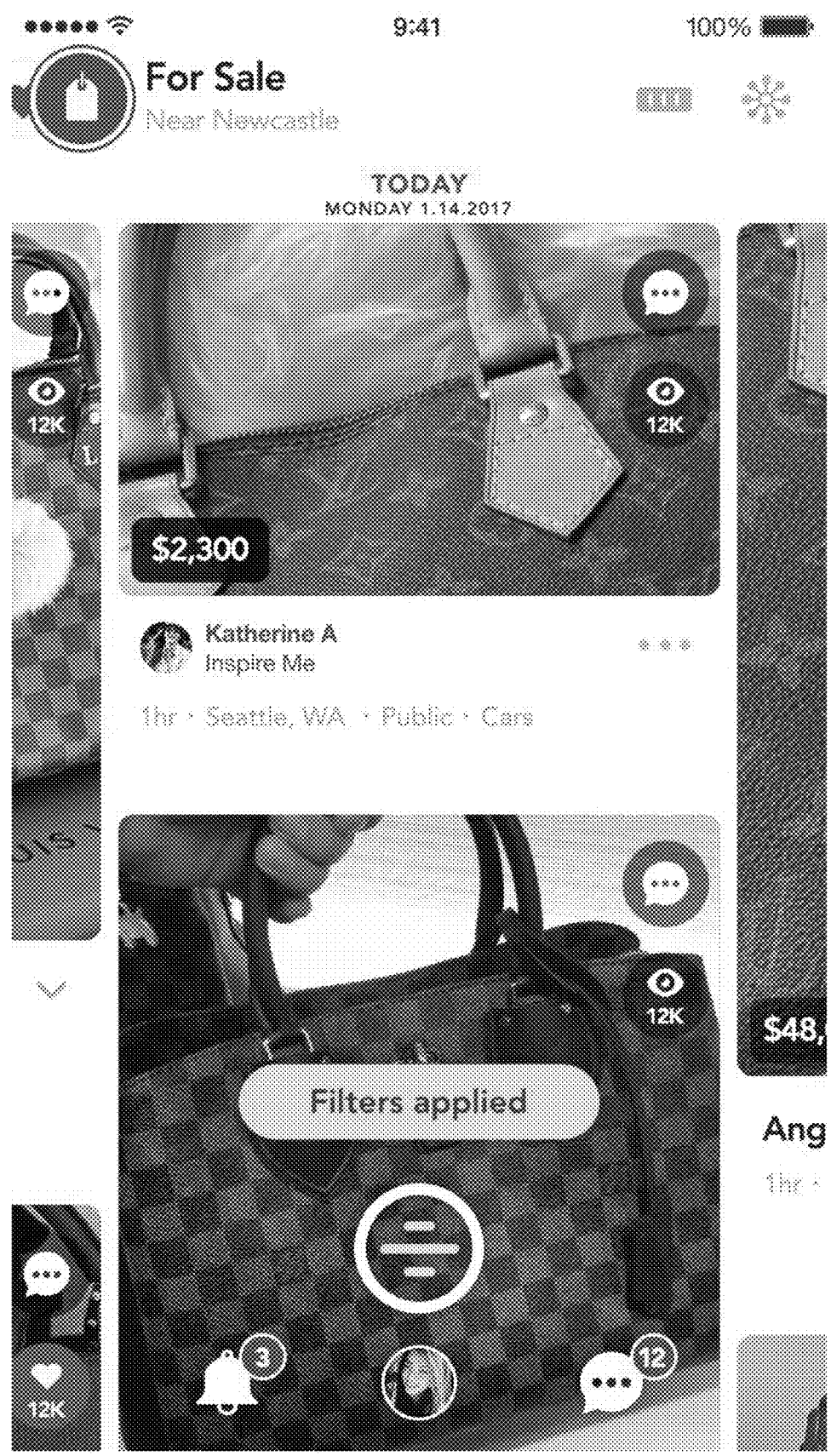
Figure 17:
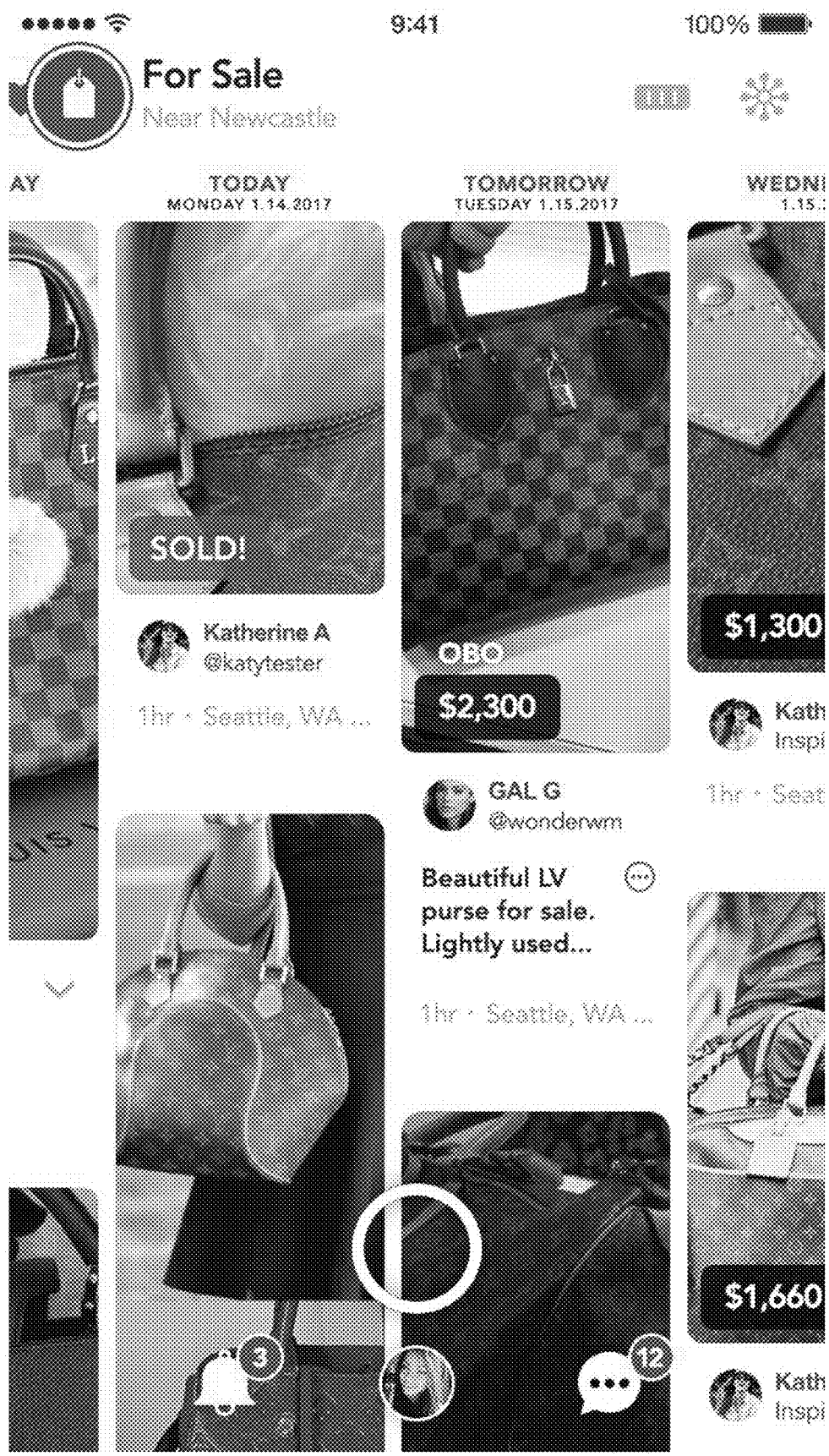

FIG. 12 is a presentation screen embodiment with teaching of several non-limiting gestures that may be employed to interact with the primary portal interface client.

FIGS. 13, 14, 15A-15B, 16, and 17 are various presentation screen embodiments of a non-limiting primary portal interface client.

Figure 18A:
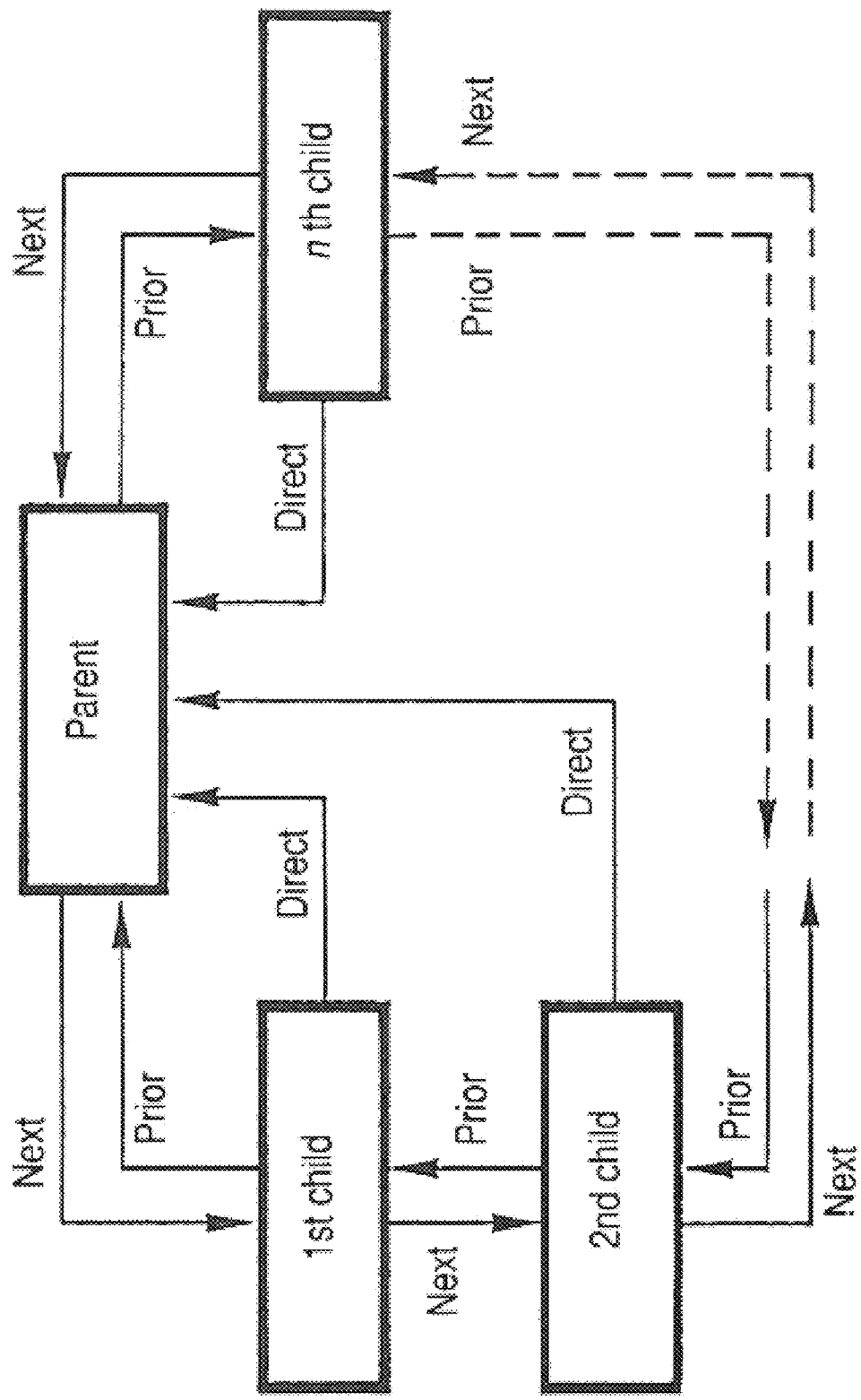
FIGS. 18A-18C are data flow diagram of a non-limiting distributed application.
Figure 18B:
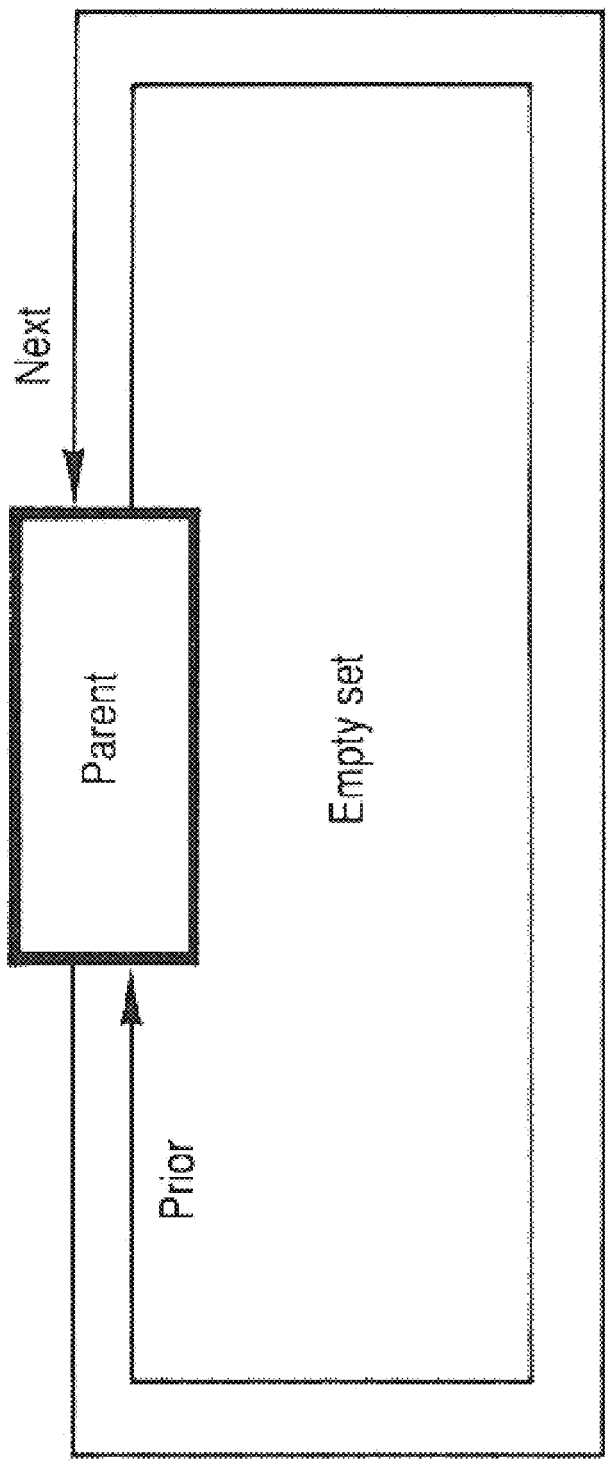
Figure 18C:
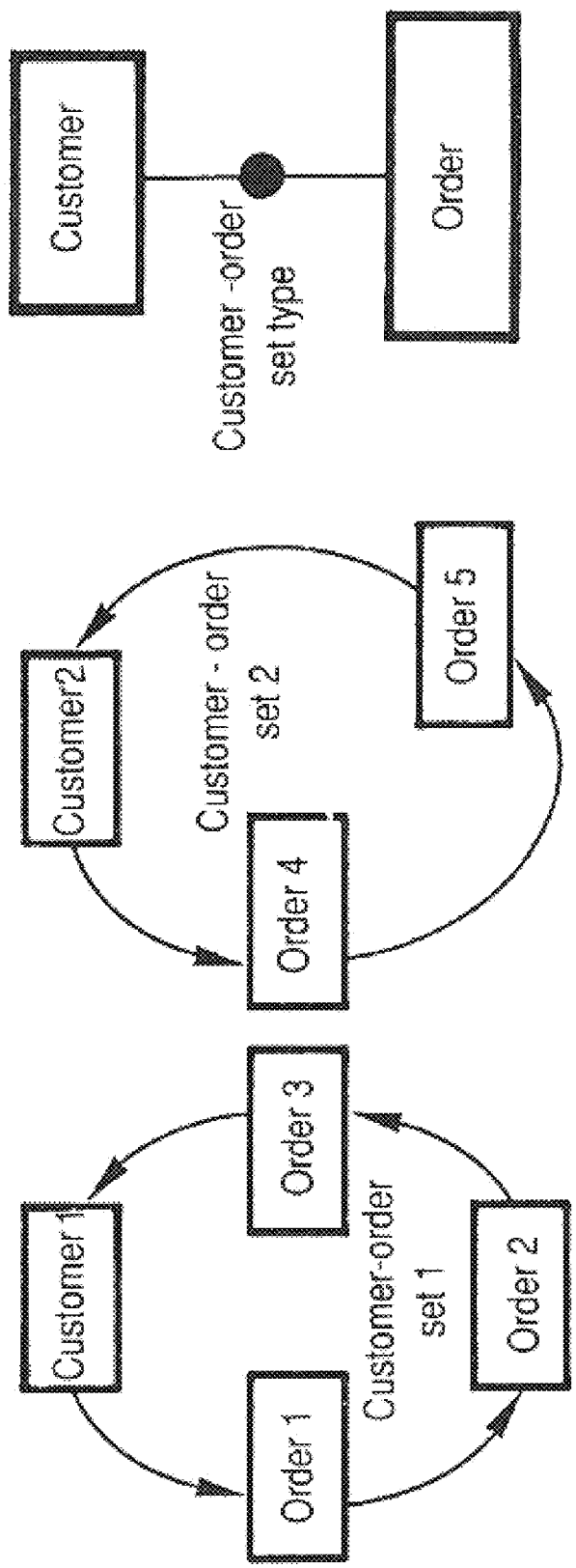

FIGS. 18A to 18C are data flow diagram of a non-limiting distributed application.

An embodiment of the present invention includes an aggregator layer for messaging integrated with a social networking website. Various users of the social networking website form virtual relationships (e.g., become friends) inside the social networking website environment, and those users, via the new aggregator layer, are able to take particular time-based group messaging actions. The functionality of the particular aggregator layer improves the field of social networking.

In an exemplary case, set forth in a non-limiting descriptive way merely to demonstrate one embodiment, five users form interconnected virtual relationships with each other (i.e., a first user, a second user, a third user, a fourth user, and a fifth user all become friends). For sake of the example, the exemplary five users are identified herein as Al, Bob, Carl, Don, and Ed. At some point, the first user, Al, posts some particular content to a social network website. The posted content may include pictures, video clips, audio clips, specific text entries, or some other types of postings. In the present example, Al posts three photographic images depicting activities in a recent vacation. When Al posts the three pictures, each of the other four users (i.e., Bob, Carl, Don, and Ed) receives an indication that Al has posted the pictures.

In the example, after seeing the pictures, the second and third users of the social network website, Bob and Carl, react favorably to one of the pictures. Bob, for example, adds a first "like," and Carl adds a second "like." The addition of the second "like" by Carl causes the social networking website to make available a specific group communication setting, which may interchangeably be referred to as a chat room, a virtual room, or the like. The specific group communication setting is not linked to either the first picture or the second picture. Instead, the specific group communication setting is expressly linked to the second picture, which was favorably commented on by the second and third users. In addition, the specific group communication setting that is expressly linked to the second picture becomes available for use by the users because at least two users have provided the favorable reaction (e.g., the "like"). Once it is available, all five of the interconnected users (i.e., Al, Bob, Carl, Don, and Ed) may enter or exit the virtual room at will. Whenever a particular user has entered the virtual room, that particular user is permitted to make particular comments, and other users can react to the particular comments.

Demonstrating the embodiment with an even more specific example, presume the first user, Al, posts a first picture of a beach setting, a second picture of an amusement park, and a third picture of a star filled sky. Bob, the second user, sees the picture of the amusement park, "likes" the picture, and adds the comment, "I love roller coasters." After Carl (i.e., the third user) sees the picture of the amusement park, Carl also "likes" the picture and comments, "Roller coasters make me dizzy." In this case, since Carl is the second user to "like" the second photograph, the social networking website enables entry into a virtual room linked expressly to the second photograph. Once enabled, any or all of the five users can communicate in real-time with each other. That is, whenever any of Al, Bob, Carl, Don, and Ed has entered the virtual room and made a comment, each of the other users that are also in the virtual room will see the comment in real time.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems including client and server computing systems, as well as networks have not been shown or described in detail to avoid unnecessarily obscuring descriptions of the embodiments.

The present invention may be understood more readily by reference to the following detailed description of the preferred embodiments of the invention. It is to be understood that the terminology used herein is for the purpose of describing specific embodiments only and is not intended to be limiting. It is further to be understood that unless specifically defined herein, the terminology used herein is to be given its traditional meaning as known in the relevant art.

Millions of people across the world communicate through social networks. These network-based software programs facilitate human connection and collaboration in specific contexts, and they provide a vast array of features that enable and enhance the types of communications that people can engage in.

Modern social networks are formed of large bodies of software resident on remote computing servers. The server-based programs cooperate with other software programs that reside on a user's local computing device (e.g., desktop, laptop, tablet, smartphone or other mobile device, camera, voice recorder, body-worn appliance, set top box, home appliance, kiosk, and the like). The remote software may be stored and arranged to execute on one computing server. Alternatively, the remote software and its various executable operations may be distributed across two or more computing servers. Local software executing on a user's device in some cases includes software programs dedicated to the social networking functionality. Alternatively, or in addition, local software may include shared software programs such as Internet browsers, networking programs, storage programs, multimedia programs, and the like.

Features of a social network are in some cases delivered using communication tool programs and interaction tool programs that operate across the Internet. Communication tool programs, or communication tools, allow users to communicate with text, sound, still or moving images, or the like. In this way, communication tools allow users to self-expressively capture, store, present, and deliver various forms of communication. For example, a first user may send a message of fun and happiness by posting a picture of a birthday party, a clown, or any other subject matter that the first user associates with fun and happiness. The first user may send other messages by posting self-created or otherwise-created video clips, audio segments, images, emoticons, unique text, and the like. When another user that is associated with the first user sees, hears, or otherwise experiences the communication posted by the first user, the other user is affected in one way or another. This other user may optionally respond to the posted communication by entering (i.e., typing) a message, forwarding the posted material, or the other user may perform other actions.

Interaction tool programs provide the software mechanisms that allow two or more users to communicate. Via the interaction tool programs, users can send and receive email and other types of messages. The users can post messages, review messages, respond to messages, edit messages, create privacy layers that determine which other users have access to certain messages, and the like.

Figure 19:
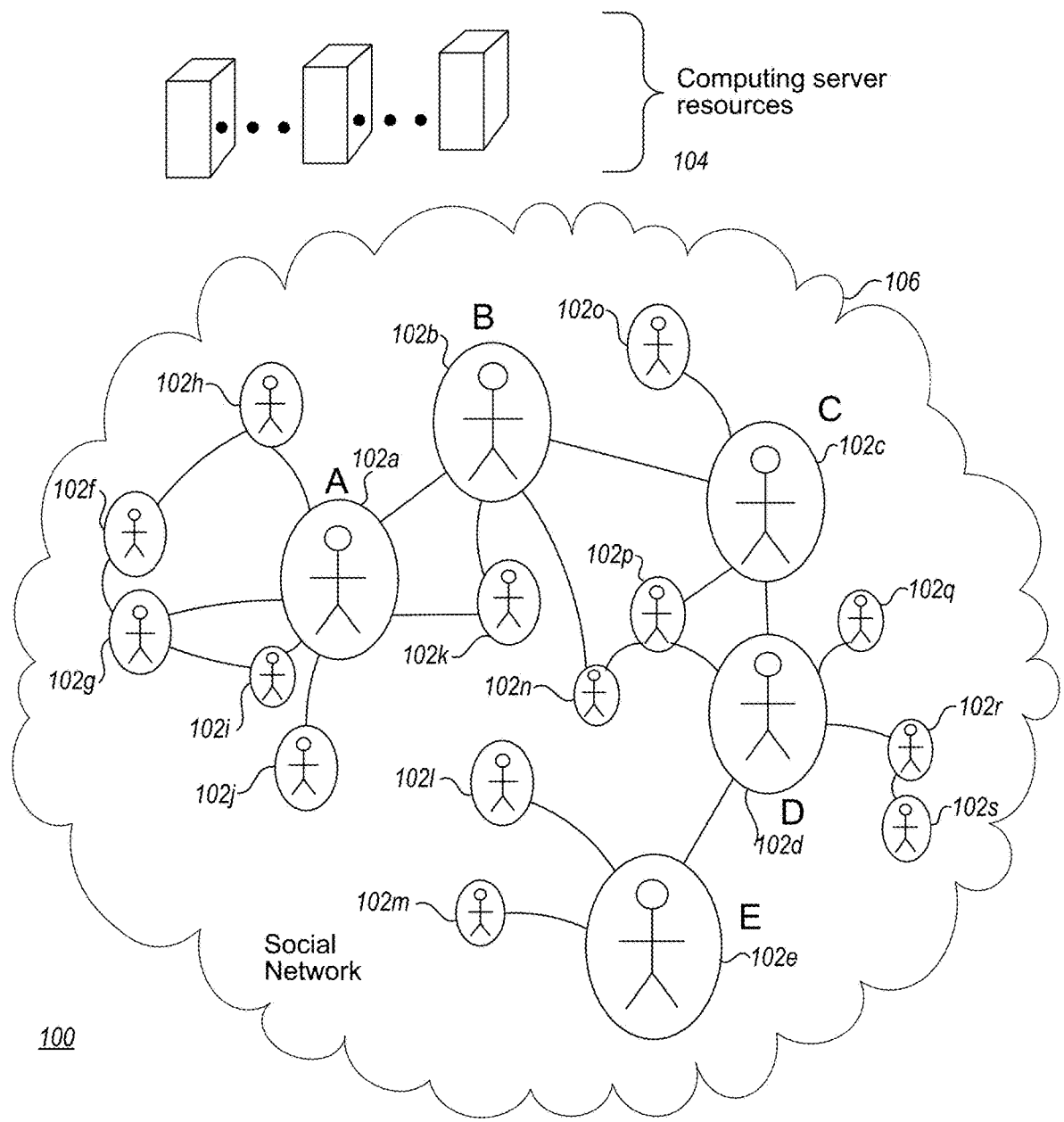
FIG. 19 illustrates a simplified social network infrastructure embodiment.

FIG. 19 illustrates a simplified social network infrastructure embodiment 100. A plurality of users 102a-102s are communicatively coupled to a set of computing server resources 104. The computing server resources 104 administer the body of software programming that forms the social network. The communicative coupling is enabled across one or more networks 106 such as the Internet, which may also include other wide area networks (WAN), local area networks (LAN), personal area networks (PAN), and any other such communication facilities.

The users 102a-102s represented in FIG. 19 may each have access to one or more local computing devices. Various ones of the users may access the computing server resources 104 to form and facilitate both loosely and tightly organized relationships with other users. Users 102a-102s may create address books, contact lists, and the like, and the users can dynamically create, grow, shrink, delete, or otherwise manage the mechanisms that determine the relationships between users. Each user in the social network is distinguished from other user based on a unique number, an email address, or some other means, and in this way a set of such means can be organized into a group.

In FIG. 19, users are referred to as 102a-102s, but other identification systems are of course contemplated. Any number of users (tens, hundreds, thousands, millions, and billions) may all access resources of the same social network. In this way, the identification of each user may include any type of computer readable mechanism. Also illustrated in FIG. 19, for ease in understanding certain embodiments described herein, users 102a-102e are also referred to as users A-E respectively, and users Al, Bob, Carl, Dave, and Ed, respectively.

Members of any particular group within the social network infrastructure may be known as "buddies," "friends," "members," "connections," or by some other term. Various levels of privacy may be assigned by a user to control the access that other users in the social network have to that owner-user's content.

Within the simplified social network infrastructure 100 of FIG. 19, users 102a-102s are provided with access to a wide variety of software applications. Many of the software applications manifest features that are dedicated to providing specific functionality that enhances relationships amongst users. For example, users can contact each other and communicate via instant messaging applications, chat rooms, email, and the like. Other software applications provided by a social network service provider may include software tools that let users post pictures, videos, audio, text, emoticons, status indicators, and the like. These software tools, or corresponding software tools, let other users access the content posted. Generally, a user that posts such information is permitted to control which other users are allowed to access the posted content.

FIG. 20 illustrates a fluid timeline social network infrastructure embodiment 100a. A fluid timeline social network allows one user to view "stories" created by another user of the computing server resources 104 that implement the fluid timeline social network system. A "story" refers to any content (i.e., an object) created (e.g., posted, entered, uploaded, or the like) by a user of the fluid timeline social network infrastructure. The story is posted by a user for any number of reasons including documentation, business, social sharing with other users (e.g., friends or other users connected to the user via the system 10) of the fluid timeline social network 100a, and the like. A story may include, for example, image, video, audio, textual, and any other such information that may be provided by a user and associated with that user's profile or account within the system.

For ease of understanding, in the embodiments described herein, stories include content of any type posted by a user. Various exemplary cases herein describe stories to include an image or a video captured by the user using, or otherwise transferred to, a local computing device, but such descriptions are not limiting. Additionally or alternatively, the stories may include a text description (e.g., text describing the image or video, or the story may be a purely text-based story), audio, tactile feedback, or any other type of content.

Considering the embodiment of FIG. 20, when a user of the fluid timeline social network infrastructure creates a story, the created story 16 may be associated by the time association module 24 with two times: a time and date the story was actually created, and a user-specified date and/or time to be assigned to the story. That is, a user can create a story at a first particular time and date, and the user can assign a second date to that story that is months or even years in the past or in the future. In such a case, the story will appear in the user's feed (as well as any other users' feeds having access to the particular user's stories) as of that assigned date months or years in the past or future.

When the user assigns a past, present, or future date and/or time to be associated with a story, then that story will show up in the user's time-based feed as having occurred (or will occur) on the assigned date and/or time. For example, a user may create a story by uploading a photo taken years in the past. The user may add descriptive text as part of the story, and the user may further associate the created story with the date that the photo was taken. Accordingly, that created story will appear in the user's feed, as well as the feeds of the user's friends, as of the date the photo was taken, and according to the date and time assigned by the user.

In the embodiment of FIG. 20, concurrent with a user creating a story, the fluid timeline social network infrastructure will timestamp the created story with the actual time and date that the story was created. As such, the stories created in the system may be catalogued (and may be displayed) based on when the stories were actually created, as well as the time that the creating user assigns to the story (e.g., when the story occurred or will occur).

User feeds or "walls" are displayed in the fluid timeline social network in two modes: a browsing mode, and a reading mode. In the browsing mode, users are presented with icons arranged along a horizontal timeline, with each icon representing a particular period of time (e.g., days, weeks, months, years, etc.) Users may scroll along the horizontal timeline (e.g., left and right) and select any particular time period or icon of interest (e.g., a day, week, month or year).

Once the particular time period is selected, the fluid timeline social network feed is switched to the reading mode. In the reading mode, particular stories that have been associated with that particular time period (e.g., a day, week, month or year) are displayed in a vertically-arranged timeline, with each story being ordered vertically based on the actual time and date that it was created (as opposed to the time that was assigned to it by the creating user).

A graphical user interface 108 in FIG. 20 is provided by local computing device of one user of the fluid timeline social network infrastructure embodiment 100a. Via the graphical user interface 108, the user can create new stories, review and edit previously created stories, access and comment on stories created by other users, and take other actions within the social network infrastructure embodiment 100a.

When creating a story, a user can enter or edit a textual description of a story. The user may create a text-only story, or may enter text describing an image or another object included within the story. Any number of tools may be provided by the social network infrastructure embodiment 100a for use by the user. For example, a location tool may be utilized to append a geospatial location (e.g., address, city, state, latitude/longitude, or the like) to a created story. A file or image uploading tool allows the user to insert a stored file or image into a new or existing story. A camera tool allows a user to take a picture or video, which may then be inserted into the story, and an emoticon tool permits entry of emoticons. A time tool allows a user to provide a date and/or time to be associated with the created story.

After the story has been created, the user may post the story utilizing a particular post story tool accessed via the graphical user interface and provided by the social network infrastructure embodiment 100a. Once the created story has been posted, that story may be optionally made available to the user, the user's friends, and/or to all users of the social network infrastructure embodiment 100a based on the user's preferences for the particular created story. That is, the graphical user interface 100 allows the user to specify a level of privacy to be associated with each created story (e.g., "public," "friends," "only me," and so on).

Within the social network infrastructure embodiment 100a, every object of created content for each story is provided with one or more unique identifiers. In some non-limiting, exemplary embodiments, the social network infrastructure embodiment 100a accesses a time association module to "timestamp" the created story with an actual time and date that the story was created and posted. As an example, the time association module may timestamp the created story with a UNIX timestamp or some other value based on such timestamp. The time association module may further be utilized during creation of the story to assign a particular date and/or time to that story. In this way, when a user specifies a date and/or time for the created story, the time association module associates the created story with the specified date and/or time. Thus, for every created story, an association is made with two separate timelines: 1) the actual date and time that the story was created and posted (e.g., the UNIX timestamp); and 2) the user-provided date and/or time that specifies when the story occurred or will occur (i.e., where the story will be displayed with respect to a timeline representation of the user's and/or other users' feeds).

In some embodiments, every story stored in by the social network infrastructure embodiment 100a is stored in a database in a main table having associated time-based accessors (e.g., pointers, references, etc.), which order the stories in two directions (e.g., forward in time and backward in time). This mechanism allows the stories to be displayed, and scrolled through, along a horizontal and a vertical timeline, as will be discussed in further detail below.

FIG. 20 also illustrates an exemplary graphical user interface 108 view of a user's fluid timeline social network feed, as provided by the social network infrastructure embodiment 100a. A set of horizontally oriented objects illustrates a "browsing" mode, and a set of vertically oriented objects illustrates a "reading" mode.

In the browsing mode, a user may view a story feed along a horizontally-arranged timeline. The feed in FIG. 20 is shown as a daily feed; however, it will be readily appreciated that the feed may be displayed, for example, in weekly, monthly, yearly, or in other increments of time. In the browsing mode, the user may scroll horizontally in either the left or right direction (e.g., utilizing a finger swipe on a touchscreen of a smartphone, a mouse, arrows or any other such input mechanisms) to highlight (i.e., bring to the center of the displayed feed) any desired day, week, month, year or the like. As shown in FIG. 20, an icon representing the stories associated with "today" 112 may be highlighted. In such a case, the icons representing the stories associated with "tomorrow" 112n, "two days from today" 112o, and "three days from today" 112p, may be displayed in order to the right of the icon for "today." Similarly, icons representing the stories associated with "yesterday" 112a, "two days ago" 112b, and "three days ago" 112c may be displayed in order to the left of the icon for today 112.

Each created story is thus associated with a browsing mode date, as specified by the user at the time of creating the story. Accordingly, the created story will be provided in the user's feed and/or other users' feeds in the browsing mode as of the date specified by the creating user. For example, if a user creates a story at 8:00 am Pacific Standard Time on May 6, 2016, but specifies a date of Apr. 22, 1996 to be associated with that story, then the created story will appear in the user's feed, as well as the feeds of other users within the user's network (e.g., friends) as having occurred on Apr. 22, 1996.

In addition to an browsing date, each created story is associated with the actual time and date that the story was created. As shown in FIG. 20, in the (vertical) reading mode, a user may view, via the graphical user interface 108, their story feed along a vertically-arranged timeline. The user may switch from the browsing mode to the reading mode, for example, by first scrolling through the browsing mode, and highlighting a particular day, week, month, year, etc. of interest. For example, as shown in FIG. 20, the user may highlight "today" 112. The user may then select the time of interest. Once selected, the user is permitted to view content (i.e., stories) in the reading mode.

In the reading mode, the stories in the user's feed (i.e., all stories associated with the user, including, for example, stories created by the user, stories created by the user's friends, stories created by users the user is following, etc.) that were associated with that particular period of time (e.g., today 112) are provided in a vertically scrollable feed. Moreover, the stories are arranged in the reading mode in chronological order, based on the actual time and date that the stories were created (e.g., as may be determined from the timestamp information appended to each created story). Thus, in the example illustration of FIG. 20, the first story 110 (i.e., Story #1) to be displayed in the user's reading mode feed may be the most recently created story having an associated date matching the date of the reading mode view (e.g., today 112). The second story 112 is the second most recently created story, and the third story 114 is the third most recently created story. By scrolling downward, the user may be provided with additional stories associated with the relevant reading mode date (e.g., today 112). As the user scrolls downward, each story is displayed in chronological order based on the date and time the story was actually created. Thus, the further downward the user scrolls, the older (i.e., created further in the past) each displayed story is.

Recognizably, the embodiments described herein with respect to chronology, "up," "down," "right," and "left" are both exemplary and relative. For example, scrolling upward may indicate the appearance of stories moving upward, may indicate the appearance of a pointer moving upward, may indicate the appearance of a background moving upward, or may indicate some other content or reference moving upward. Accordingly, many such contexts have been contemplated.

Figure 21:
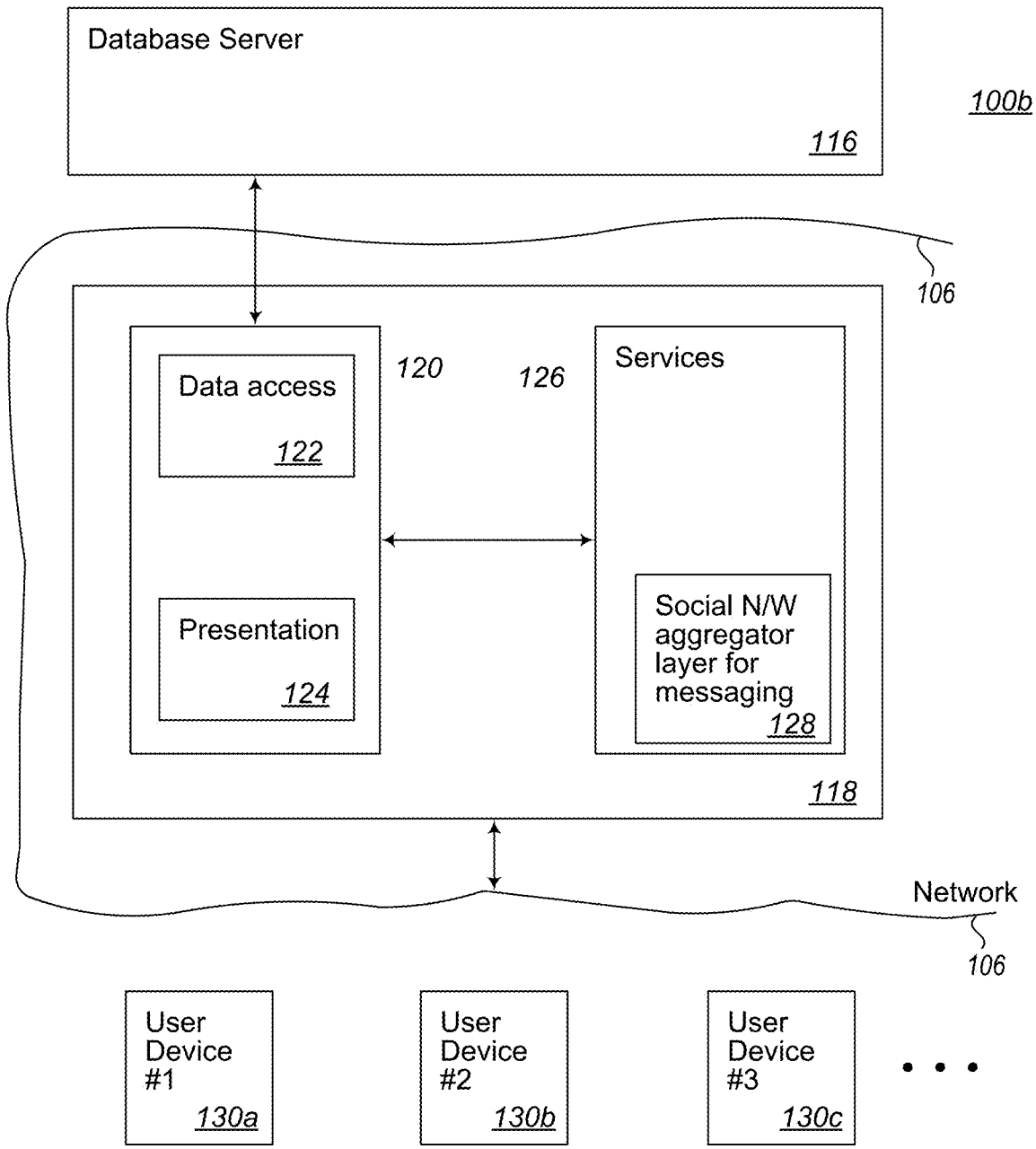
FIG. 21 illustrates another social network infrastructure embodiment.

FIG. 21 illustrates another social network infrastructure embodiment 100b. The embodiment of FIG. 21 may include structures, software, and other features of one or both of the social network infrastructure embodiments of FIGS. 19 and 20. Alternatively, or in addition, the embodiment of FIG. 21 may include other structures, software, and features not found in the embodiments of FIG. 19, FIG. 20, or FIGS. 19 and 20.

In the social network infrastructure embodiment 100b of FIG. 21, computing server logic 118 is communicatively coupled to database server logic 116 and a plurality of user computing devices 130a, 130b, 130c, via one or more networks 106 (e.g., the Internet, LANs, WANs, etc.). Each user device 130a-130c may be associated with any one of the users 102a-102s (FIG. 19).

The social network infrastructure embodiment 100b of FIG. 21 does not expressly illustrate any or all of the processing logic, non-transitory volatile and non-volatile memory structures, buses, programs, applications, interfaces, input/output devices, and other features conventionally found in computing devices. The particular omissions are intentional so as to more simply recognize and describe certain features of the embodiments. Furthermore, those of ordinary skill in the art will understand that database server logic 116 includes structures and software logic to create and store user information, story information, and functional information to carry out the features of the social network infrastructure embodiment 100b. In addition, those of ordinary skill in the art will also understand that data access logic 122 provides data input and data retrieval functions in cooperation with the database server logic 116, and presentation logic 124 provides website and other like presentation functions in cooperation with communication logic and presentation logic (e.g., a browser) associated with user devices 130a-130c.

Various services are also provided by services logic 126. The services facilitate internal functions of the social network infrastructure embodiment 100b and external features provided to the particular user devices 130a-130c. The services, not all of which are illustrated in FIG. 21 for simplicity, may include story posting services, story editing services, services to layer various levels of privacy within a particular user's group of "friends," data redundancy services, encryption/decryption or other like security features, and more.

On feature represented in FIG. 21 is implemented in social network aggregator layer for messaging logic 128. The social network aggregator layer for messaging logic 128 administers a collective network group messaging feature. The collective network group messaging feature enables users of the social network infrastructure embodiment 100b to participate in particular form of group messaging explained in more detail with respect to FIGS. 22-25.

Figure 22:
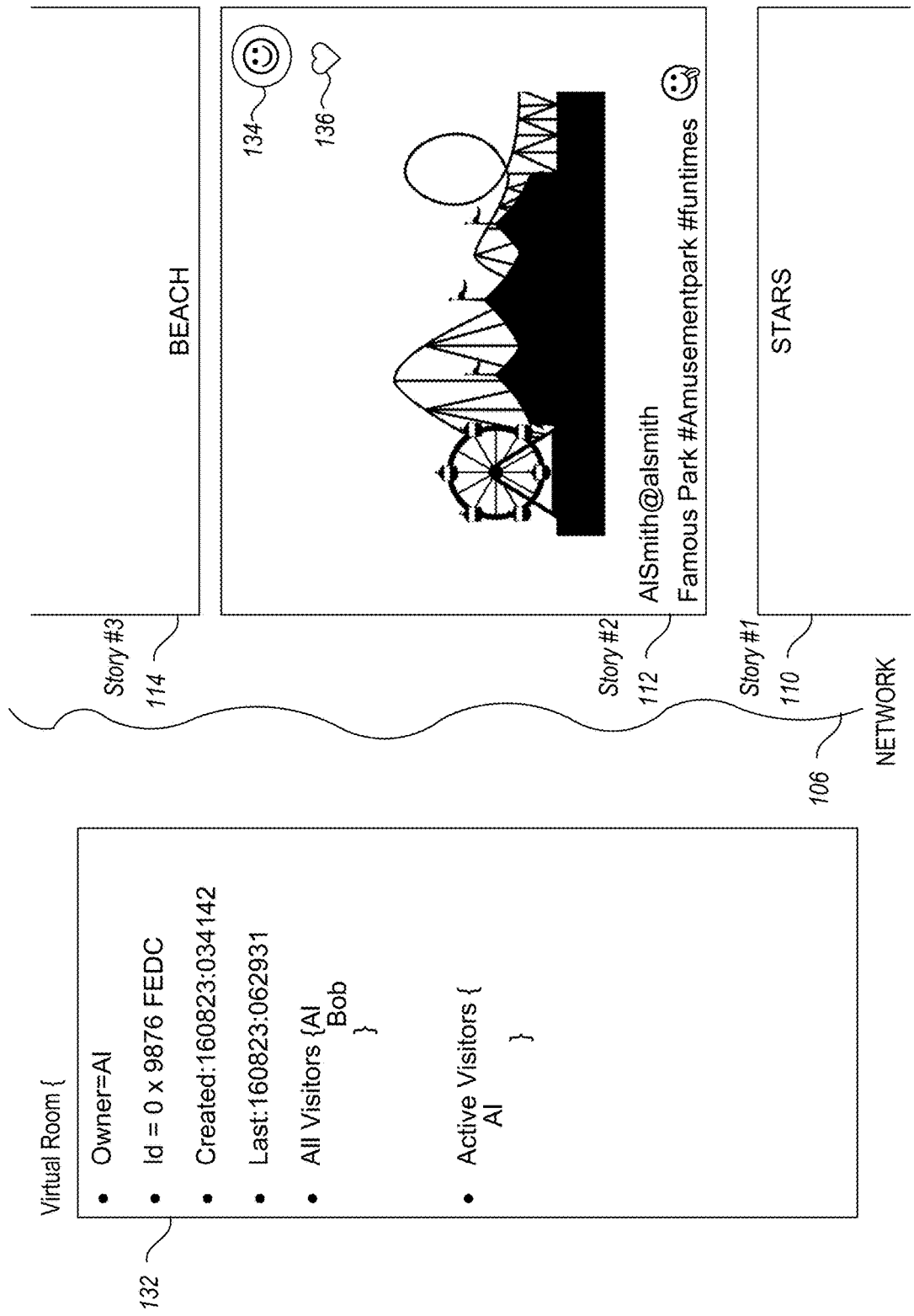
FIG. 22 is a portion of a graphical user interface and a portion of a memory structure in a first state.
Figure 23:
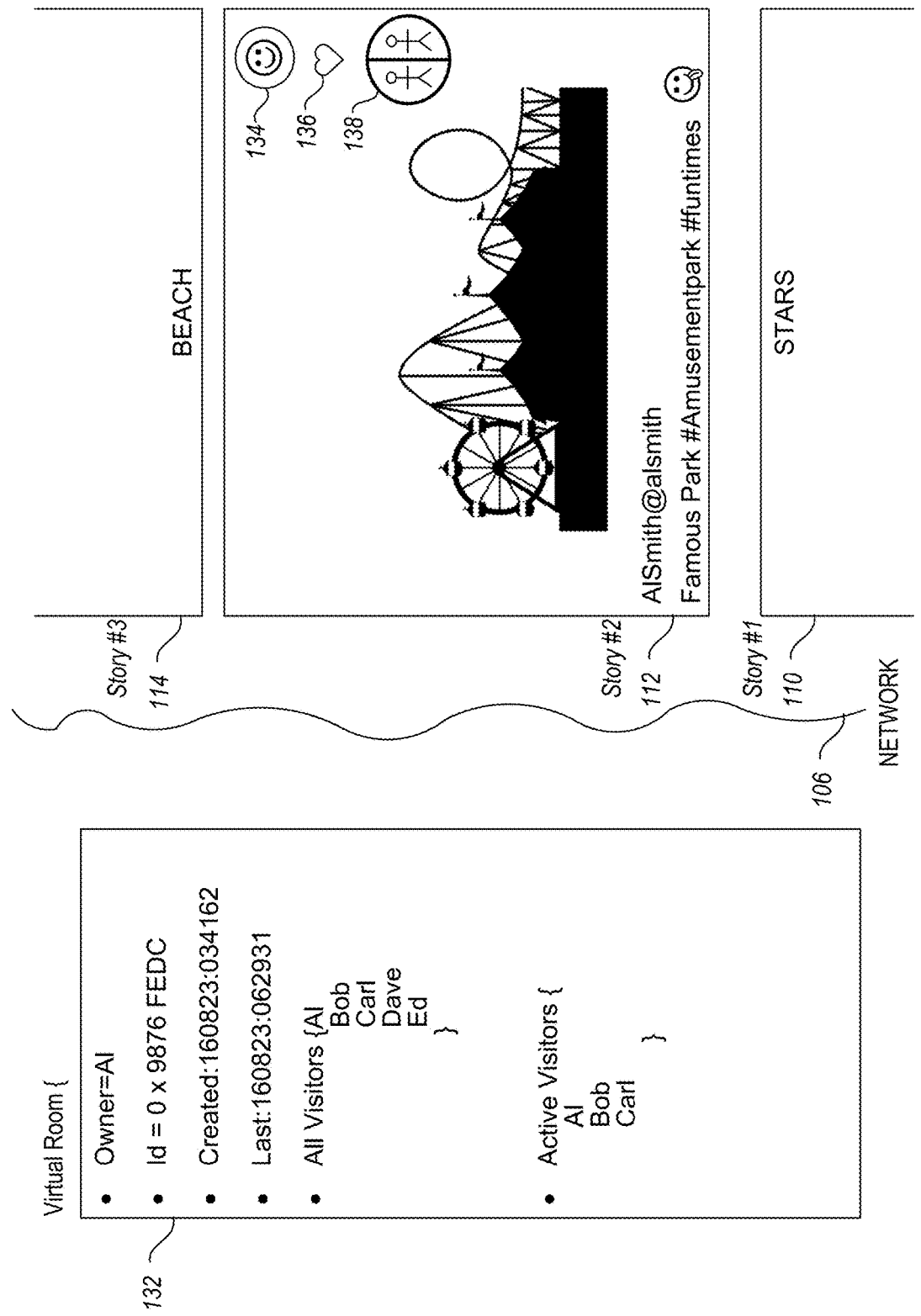
FIG. 23 is a portion of a graphical user interface and a portion of a memory structure in a second state.
Figure 24:
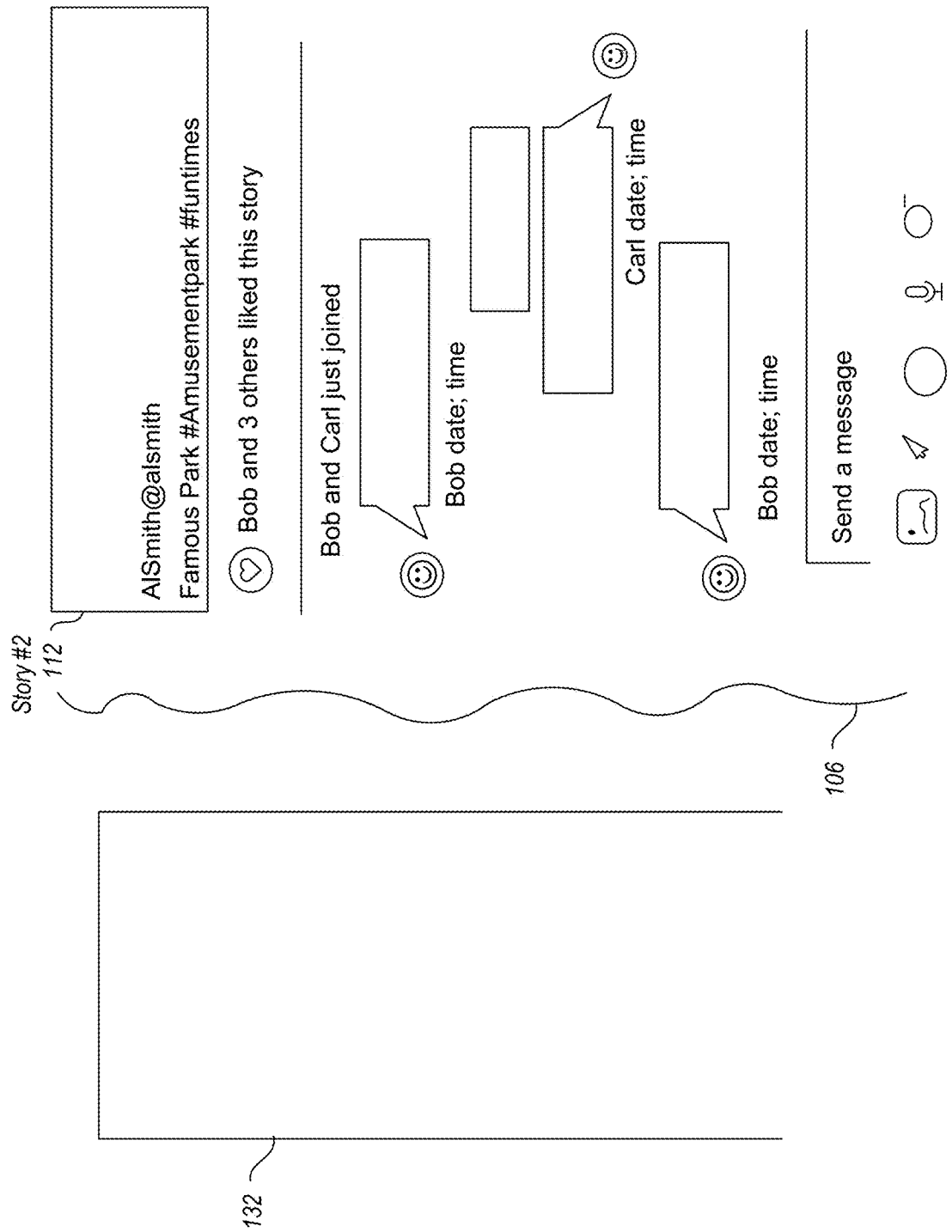
FIG. 24 is a portion of a graphical user interface and a portion of a memory structure in a third state.

FIG. 22 is a portion of a graphical user interface and a portion of a memory structure in a first state, FIG. 23 is a portion of a graphical user interface and a portion of a memory structure in a second state, and FIG. 24 is a portion of a graphical user interface and a portion of a memory structure in a third state.

In FIGS. 22-24, certain portions of the graphical user interface 108 illustrate one or more of a first story 110 (i.e., starry sky), a second story 112 (i.e., amusement park), and a third story 114 (i.e., beach scene). Each of the graphical user interface 108 portions are illustrated to the right of one or more networks 106, which indicates communicative coupling through the one or more networks 106 with one or more computing server resources 104 (FIG. 19) on the left. As illustrated in FIGS. 22-24, only a portion of the computing server resources 104 are shown, and in particular, a "virtual room" memory structure 132.

The virtual room memory structure 132 of FIGS. 22-24 is exemplary only. Other embodiments are of course contemplated. In addition, only certain portions of the virtual room memory structure 132 are represented for simplicity in the explanation.

In the virtual room memory structure 132, a first entry identifies the ".owner" of the virtual room memory structure 132. In this case, user 102a is the owner. In this embodiment, user 102a, interchangeably referred to as "Al," has created and posted the illustrated second story 112. Al has also created and posted the first story 110 and third story 114, but such content is not the subject matter of the present discussion. A second entry in the virtual room memory structure 132 is a particular identifier, ".Id." The identifier is an identifier that is sufficiently unique so as to allow the social network infrastructure embodiment 100b to distinguish the second story 112 from all other stories captured by the social network infrastructure embodiment 100b. A created date ".Created," is captured, which in FIGS. 22-24 is illustrated as "160823:034142," indicating the content was posted b Al in the social network infrastructure embodiment 100b on Aug. 23, 2016, at 03:41:42 Zulu. The particular story was last accessed, ".Last," on Aug. 23, 2016 at 06:29:31 Zulu.

Two sub-structures are also represented in the virtual room memory structure 132, an ".AllVisitors" structure and an ".ActiveVisitors" structure. In the simplified representation of FIGS. 22-24, simple identifiers of one or more users 102a-102f (i.e., Al, Bob, Carl, Dave, and Ed) are shown. Naturally, the structures may be constituted differently in different embodiments, and other types and styles of identifiers may also be used.

The second story 112 illustrates a content owner identifier 134 in the graphical user interface 108. In the embodiment of FIGS. 22-24, the content owner identifier 134 indicates that the second user 102a, Al, is has posted and thereby owns the second story 112. A favorable reaction indicator 136 is also shown in the graphical user interface 108. This indicator may be selected and asserted in one way or another by certain users, or in some cases any user, that view the second story 112. In this way, a particular user can indicate their "like" for the story.

FIG. 22 can be distinguished from FIG. 23 in a first way. FIG. 22 shows a portion of graphical user interface 108 in a first state, and FIG. 23 shows a corresponding portion of the same graphical user interface 108 in a second state. The graphical user interface 108 in FIG. 23 includes another indicator. Specifically, a virtual room attendees indicator 138 is shown in FIG. 23. The virtual room attendees indicator 138 shows the more recent (i.e., the last) two users that have asserted the favorable reaction indicator 136 associated with the second story 112. In other embodiments, more or fewer than two users may be represented by the virtual room attendees indicator 138. Alternatively, or in addition, the virtual room attendees indicator 138 may optionally indicate the number of active users currently present in the virtual room.

FIG. 22 can be distinguished from FIG. 23 in a second way. The virtual room memory structure 132 of FIG. 23 has been updated. In FIG. 23, the .AllVistors sub-structure indicates that users 102a-102f (i.e., Al, Bob, Carl, Dave, and Ed) have all visited the virtual room. In addition, Al, Bob, and Carl are all active visitors.

In FIG. 24, at least two users have indicated and asserted the favorable reaction indicator 136. In addition, user 102b (i.e., Bob) and user 102c (i.e., Carl) have also asserted the virtual room attendees indicator 138. This action is detected by the social network aggregator layer for messaging logic 128 of the social network infrastructure embodiment 100b. This action has caused the social network aggregator layer for messaging logic 128 to present a virtual room on the respective graphical user interfaces 108 of Bob and Carl. As indicated in FIG. 24, Bob and Carl may now carry on real time communication session associated with the second story 112. Any number of other users, and including Bob and Carl, may enter or leave the collective network group messaging feature (i.e., the virtual room), at any time.

In embodiments discussed herein, the social network aggregator layer for messaging logic 128 creates a virtual room memory structure for every piece of content (i.e., for every story) captured by the social network infrastructure embodiment 100b, which is, for example, when a user posts a picture, a video, a text entry, or the like. The initial structure may indicate no active visitors, though the structure is defined and ready for use. Subsequently, when a threshold number of users have asserted the favorably reaction indicator 136, the virtual room is further populated and the feature becomes accessible to users.

The social network aggregator layer for messaging logic 128, as indicated in FIG. 24, may provide a wide number of features. For example, users may be permitted to enter text via a keyboard, a touch screen, a voice recognition system, or any other means. Emoticons may be added, various shortcuts may be enabled, time and date stamps may be added and visible or not visible, and many other features may also be included.

Figure 25:
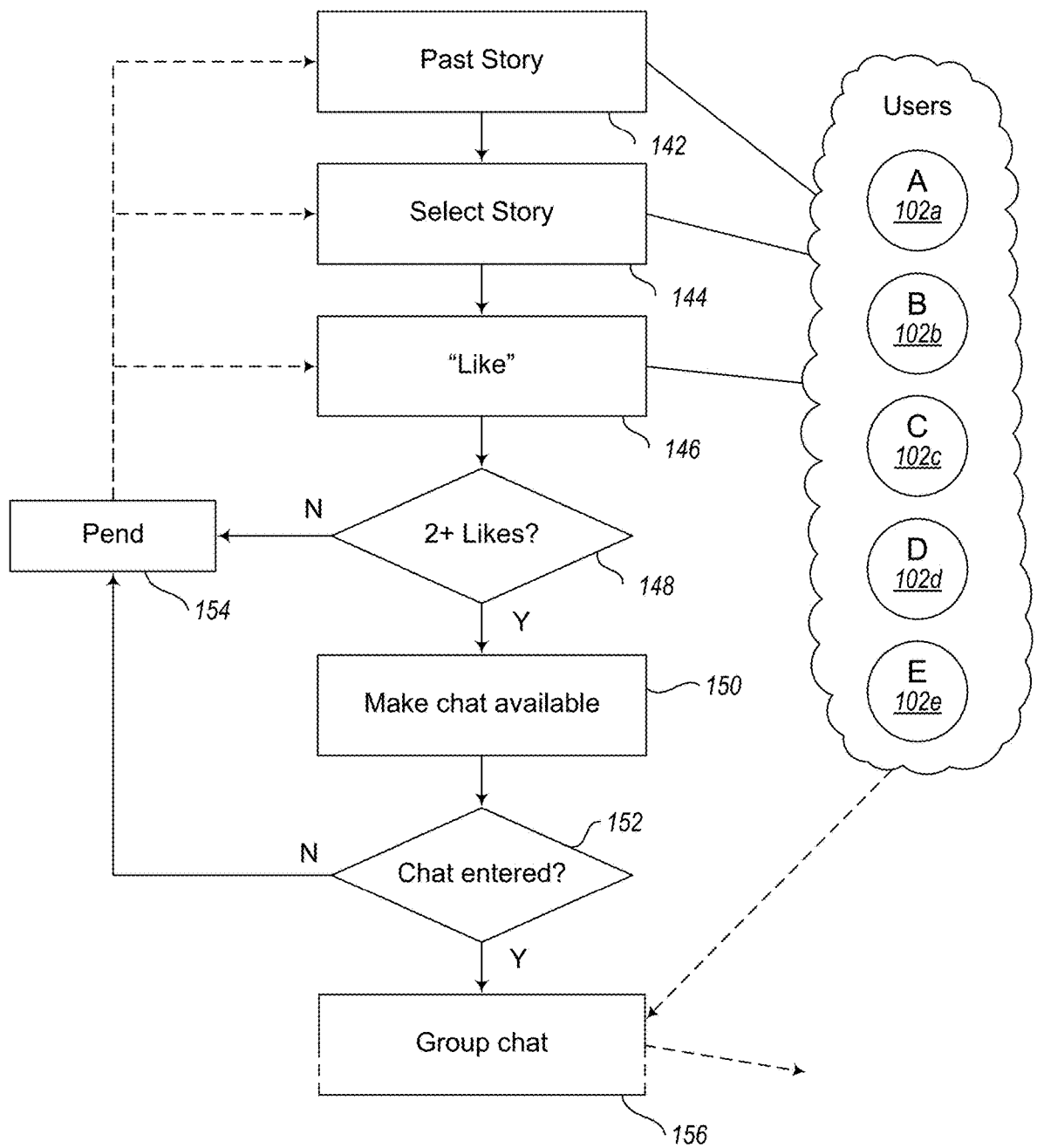
FIG. 25 is a logic flow diagram corresponding to the social network infrastructure embodiment of FIGS. 21-24.

FIG. 25 is a logic flow diagram 140 corresponding to the social network infrastructure embodiment 100b.

At 142, any of users 102a-102e may post a story. At 144, any of the users 102a-102e may select a particular story. At 146, users may assert a favorable reaction indicator associated with the selected or posted story. At 148, the social network aggregator layer for messaging logic 128 detects each assertion of the favorable reaction indicator and determines if a particular threshold has been reached. In some embodiments, the threshold is set at two. In this way, for example, if at least two users "like" a particular story, then the virtual room features is enabled and made available to the two users and other users who also "like" the story.

If the threshold is not crossed at 148, then the social network aggregator layer for messaging logic 128 pends at 154 for further action by any particular user. Alternatively, if the threshold at 148 is crossed, then particular datums of the virtual room memory structure 132 are updated, and the virtual room is made available for use by the users.

At 152, if any users enter the virtual room, then the collective network group messaging feature is enabled at 156. Alternatively, if no users have entered the virtual room, then processing advances to 154 to pend. The dashed line at 156 indicates that the collective network group messaging feature may be enabled and accessed for any duration, for any length and number of comments, and for other variable features. Along these lines, the dashed lines between the one or more networks 106 indicates that any number of users 102*a*-102*e* may enter and access the collective network group messaging at 156, and any number of users 102*a*-102*e* may exit the feature.

Processing of the logic flow at 140 is perpetual and ongoing.

Certain words and phrases used in the specification are set forth as follows. The terms "include" and "comprise," as well as derivatives thereof, mean inclusion without limitation. The term "or," is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation, such a device may be implemented in hardware, firmware, or software, or some combination of at least two of the same. The functionality associated with any particular controller may be centralized or distributed, whether locally or remotely. Other definitions of certain words and phrases may be provided within this patent document. Those of ordinary skill in the art will understand that in many, if not most instances, such definitions apply to prior as well as future uses of such defined words and phrases.

Computing server resources and local computing devices as described herein are particular computer systems. Fluid timeline social network and other computer systems and methods are provided herein that include, or are performed by, computer devices that are specifically programmed to provide, access and utilize the fluid timeline social network or other such social network. The computer devices (including, for example, one or more server computer devices and one or more client or user computer devices) include particular features and functionalities which make such computer devices suitable for use in social network systems and methods, as described herein. In particular, the computer systems and methods provided herein are applicable to social network computing systems having or providing a visual user interface for displaying records-based content, with user computer devices being networked or networkable computer devices capable of accessing the fluid timeline social network.

Further, the fluid timeline social network and other social networks provided herein are applicable to records-based content generation, storage, access and sharing, and such networks provide such records-based content to the networked computer devices for display in a prioritized manner. That is, the records-based content (which may include time-indexed "stories," as described in further detail herein), is provided for display on the networked user computer devices in such a way as to prioritize attention to information selected by or predicted to be relevant to a user. In particular, in some embodiments, the records-based content is prioritized (and provided for display) based on an actual time of creation of the records-based content and/or a user-specified time associated with such records-based content at the time of creation by the user.

Accordingly, it will be readily appreciated that the serial network aggregator layer for messaging logic 128 applied in fluid timeline social network systems and methods and other social network systems provided herein constitute an improvement in the computer-related technology of social network computer systems that only provide "group chat" functionality based on a pre-selected topic in a closed and controlled environment, with user computer devices being networked or networkable computer devices capable of accessing the social network.

Similarly, it will be readily appreciated that the serial network aggregator layer for messaging logic systems and methods provided herein cannot be provided, accessed and performed by all types of computing systems or even by conventional general purpose computing systems. For example, computing devices such as industrial controllers, simple state machines, programmable logic controllers (PLCs), any non-UI (user interface) computing device, and any other such computing devices that are not specifically programmed (or programmable) to provide the serial network aggregator layer for messaging logic systems and methods provided herein and/or lacking the features and functionalities (e.g., a visual user interface; networked or networkable user computer devices; generating, storing and accessing records-based content; prioritizing provision and display of records-based content, and permitting real-time, story-based collective network grouped messaging features) of such computer systems and methods are not intended to be considered within the scope of the present disclosure.

Having now set forth certain embodiments, further clarification of certain terms used herein may be helpful to providing a more complete understanding of that which is considered inventive in the present disclosure.

A non-comprehensive, non-limiting list of computing devices is provided to aid in understanding the bounds of the terms, "computing device" and "mobile computing device," as used herein. Computing devices (i.e., mobile devices) include cell phones, smart phones, flip phone, tablets, phablets, handheld computers, laptop computers, body-worn computers, and the like. Certain other electronic equipment in any form factor may also be referred to as a mobile computing device when this equipment is provisioned for use to execute the health related acts described in the present disclosure. Examples of this other electronic equipment include in-vehicle devices, medical devices, industrial equipment, retail sales equipment, wholesale sales equipment, utility monitoring equipment, and other such equipment used by private, public, government, and other entities.

Computing devices further have a collection of input/output ports for passing data over short distances to and from other computing devices. For example, serial ports, USB ports, WiFi ports, Bluetooth ports, IEEE 1394 FireWire, and the like can communicatively couple the mobile device to other computing apparatuses.

Computing devices may a battery or another power source, and they may or may not have a display. In many mobile devices, a signal strength indicator is prominently positioned on the display to provide network communication connectivity information to the mobile device user.

A cellular transceiver may be included in a computing device to couple the computing device to other communication devices through a cellular-based communication network. In some cases, software and data in a file system are communicated between the mobile computing device and a computing server via a cellular transceiver. That is, bidirectional communication between a mobile devices, other computing devices, and a computing server is facilitated by the cellular transceiver. For example, a computing server may download a new or updated version of software to the computing device over the cellular-based communication network. As another example, the computing device may communicate any other data to the computing server over the cellular-based communication network or another network.

Each computing device client has electronic memory accessible by at least one processing unit within the device. The memory is programmed with software that directs the one or more processing units. Some of the software modules in the memory control the operation of the computing device with respect to generation, collection, and distribution or other use of data. In some cases, software directs the collection of individual datums, and in other cases, software directs the collection of sets of data.

Software may include a fully executable software program, a simple configuration data file, a link to additional directions, or any combination of known software types. When the computing server updates software, the update may be small or large. For example, in some cases, a computing server downloads a small configuration data file to as part of software, and in other cases, computing server completely replaces all of the present software on a computing device with a fresh version. In some cases, software, data, or software and data is encrypted, encoded, and/or otherwise compressed for reasons that include security, privacy, data transfer speed, data cost, or the like.

Processing devices, or "processors," as described herein, include central processing units (CPU's), microprocessors, microcontrollers (MCU), digital signal processors (DSP), application specific integrated circuits (ASIC), state machines, and the like. Accordingly, a processor as described herein includes any device, system, or part thereof that controls at least one operation, and such a device may be implemented in hardware, firmware, or software, or some combination of at least two of the same. The functionality associated with any particular processor may be centralized or distributed, whether locally or remotely. A processors may interchangeably refer to any type of electronic control circuitry configured to execute programmed software instructions. The programmed instructions may be high-level software instructions, compiled software instructions, assembly-language software instructions, object code, binary code, micro-code, or the like. The programmed instructions may reside in internal or external memory or may be hard-coded as a state machine or set of control signals. According to methods and devices referenced herein, one or more embodiments describe software executable by the processor, which when executed, carries out one or more of the method acts.

As known by one skilled in the art, a computing device, including a mobile computing device, has one or more memories, and each memory may comprise any combination of volatile and non-volatile computer-readable media for reading and writing. Volatile computer-readable media includes, for example, random access memory (RAM). Non-volatile computer-readable media includes, for example, any one or more of read only memory (ROM), magnetic media such as a hard-disk, an optical disk, a flash memory device, a CD-ROM, and the like. In some cases, a particular memory is separated virtually or physically into separate areas, such as a first memory, a second memory, a third memory, etc. In these cases, it is understood that the different divisions of memory may be in different devices or embodied in a single memory. Some or all of the stored contents of a memory may include software instructions executable by a processing device to carry out one or more particular acts.

In the present disclosure, memory may be used in one configuration or another. The memory may be configured to store data. In the alternative or in addition, the memory may be a non-transitory computer readable medium (CRM) wherein the CRM is configured to store instructions executable by a processor. The instructions may be stored individually or as groups of instructions in files. The files may include functions, services, libraries, and the like. The files may include one or more computer programs or may be part of a larger computer program. Alternatively or in addition, each file may include data or other computational support material useful to carry out the computing functions of the systems, methods, and apparatus described in the present disclosure.

One or more data flow embodiments are included in the present disclosure. In these, each described process may represent a module, segment, or portion of code, which comprises one or more executable instructions for implementing the specified logical function(s). It should also be noted that in some implementations, the functions noted in the process may occur in a different order, may include additional functions, may occur concurrently, and/or may be omitted.

As used in the present disclosure, the terms "information," "data," and other like words, in all of their grammatical forms, may be used interchangeably as dictated by their use. For example, information, data, and other like words are used to describe human readable information and computing device readable information. The information may be text, multimedia, signals, command, controls, or any other such information. The information and data described in the present disclosure is information and data capable of digital representation within the circuitry of a computing device in any useful format.

As used in the present disclosure, the term "emption," which is used, for example, to identify a particular type of user of a multi-blockchain proof-of-activity platform (e.g., an "information emption user $202a$," includes the concepts of obtaining, acquiring, procuring, earning, bargaining for, winning, paying for, purchasing, renting, leasing, exchanging for consideration, shopping for, mining, hedging, speculating in, investing in, trading in, redeeming, subsidizing, and the like.

As used in the present disclosure, the term "module" refers to an application specific integrated circuit (ASIC), an electronic circuit, a processor and a memory operative to execute one or more software or firmware programs, combinational logic circuitry, or other suitable components (hardware, software, or hardware and software) that provide the functionality described with respect to the module.

The terms, "real-time" or "real time," as used herein and in the claims that follow, are not intended to imply instantaneous processing, transmission, reception, or otherwise as the case may be. Instead, the terms, "real-time" and "real time" imply that the activity occurs over an acceptably short period of time (e.g., over a period of microseconds or milliseconds), and that the activity may be performed on an ongoing basis (e.g., recording and reporting the collection of health therapy data and the like). An example of an activity that is not real-time is one that occurs over an extended period of time (e.g., hours or days)] or that occurs based on intervention or direction by a person or other activity.

Where the terms "substantial" or "about" in any grammatical form are used as modifiers in the present disclosure and any appended claims (e.g., to modify a structure, a dimension, a measurement, or some other characteristic), it is understood that the characteristic may vary by up to 30 percent. For example, a NavSel 216 may be described as substantially approaching or substantially covering a user choice (e.g., an icon). In these cases, an determined covering of 25 percent may be varied by a value higher or lower than the determined covering by up to 7.5% (i.e., between 17.5% and 32.5%).

The terms "include" and "comprise" as well as derivatives thereof, in all of their syntactic contexts, are to be construed without limitation in an open, inclusive sense, (e.g., "including, but not limited to"). The term "or," is inclusive, meaning and/or. The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as, "comprises" and "comprising," are to be construed in an open, inclusive sense, e.g., "including, but not limited to."

Reference throughout this specification to "one embodiment" or "an embodiment" and variations thereof means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content and context clearly dictates otherwise. It should also be noted that the conjunctive terms, "and" and "or" are generally employed in the broadest sense to include "and/or" unless the content and context clearly dictates inclusivity or exclusivity as the case may be. In addition, the composition of "and" and "or" when recited herein as "and/or" is intended to encompass an embodiment that includes all of the associated items or ideas and one or more other alternative embodiments that include fewer than all of the associated items or ideas.

In the present disclosure, conjunctive lists make use of a comma, which may be known as an Oxford comma, a Harvard comma, a serial comma, or another like term. Such lists are intended to connect words, clauses or sentences such that the thing following the comma is also included in the list.

As described herein, for simplicity, a user is in some case described in the context of the male gender. For example, the terms "his," "him," and the like may be used. It is understood that a user can be of any gender, and the terms "he," "his," and the like as used herein are to be interpreted broadly inclusive of all known gender definitions.

As the context may require in this disclosure, except as the context may dictate otherwise, the singular shall mean the plural and vice versa; all pronouns shall mean and include the person, entity, firm or corporation to which they relate; and the masculine shall mean the feminine and vice versa.

When so arranged as described herein, each computing device may be transformed from a generic and unspecific computing device to a combination device comprising hardware and software configured for a specific and particular purpose. When so arranged as described herein, to the extent that any of the inventive concepts described herein are found by a body of competent adjudication to be subsumed in an abstract idea, the ordered combination of elements and limitations are expressly presented to provide a requisite inventive concept by transforming the abstract idea into a tangible and concrete practical application of that abstract idea.

The headings and Abstract of the Disclosure provided herein are for convenience only and do not limit or interpret the scope or meaning of the embodiments.

The various embodiments described above can be combined to provide further embodiments. Aspects of the embodiments can be modified, if necessary to employ concepts of the various patents, application and publications to provide yet further embodiments.

This application claims the benefit of priority to U.S. Provisional Application No. 62/692,547, filed Jun. 29, 2018, which application is hereby incorporated by reference in its entirety.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving a request from a first user to generate a distributed social mesh for the first user; and
in response to receiving the request:
generating the distributed social mesh for the first user;
providing an initial token to the first user; and
enabling the first user to exchange the initial token with the at least one other entity;
receiving an activity with the distributed social mesh by a second user;
generating a token for the second user based on the activity by the second user with the distributed social mesh; and
enabling the second user to exchange the token with at least one other entity.

2. The method of claim 1, wherein generating the distributed social mesh comprises:
securely storing content in the distributed social mesh using a private blockchain for the first user.

3. The method of claim 1, wherein generating the distributed social mesh comprises:
establishing a smart contract between the first user and the second user to enable the second user to access the distributed social mesh of the first user.

4. The method of claim 1, further comprising:
receiving a request from an entity to provide information to the first user; and
in consideration for providing the information to the user, providing a second token from the entity to the first user.

5. The method of claim 1, wherein generating the token for the second user further comprises:
generating the token for the second user in response to the second user accessing content stored in the distributed social mesh of the first user.

6. The method of claim 1, further comprising:
in response to the first user accessing the distributed social mesh, providing a first sub-token to the first user; and
in response to the first user adding content to the distributed social mesh, providing a second sub-token to the first user.

7. A non-transitory processor-readable storage medium having computer instructions stored thereon that, when executed by one or more processors, cause the one or more processors to perform actions, the actions comprising:
receiving a request from a user to generate a distributed social mesh for the user;
in response to receiving the request:
generating the distributed social mesh for the user;
providing an initial token to the user; and
enabling the user to exchange the token with at least one other entity;
in response to the user accessing the distributed social mesh, providing a first sub-token to the user; and
in response to the user adding content to the distributed social mesh:
determining a size of the content added to the distributed social mesh by the user;
selecting an amount of sub-tokens to provide the user based on the size of the content; and
providing the selected amount of sub-tokens to the user.

8. The non-transitory processor-readable storage medium of claim 7, wherein the computer instructions, when executed by the one or more processors, cause the one or more processors to perform further actions, the further actions comprising:
receiving another request from an entity to provide information to the user; and
in consideration for providing the information to the user, providing a second token from the entity to the user.

9. The non-transitory processor-readable storage medium of claim 7, wherein the computer instructions, when executed by the one or more processors, cause the one or more processors to perform further actions, the further actions comprising:
in response to the user accessing the content on another distributed social mesh of another user, providing one or more third sub-tokens to the user.

10. The non-transitory processor-readable storage medium of claim 7, wherein the computer instructions, when executed by the one or more processors, cause the one or more processors to perform further actions, the further actions comprising:
receiving an activity with the distributed social mesh by a second user;
generating another token for the second user based on the activity with the distributed social mesh; and
enabling the second user to exchange the token with the at least one other entity.

11. The non-transitory processor-readable storage medium of claim 7, wherein the computer instructions, when executed by the one or more processors to generate the distributed social mesh, cause the one or more processors to perform further actions, the further actions comprising:
securely storing the content in the distributed social mesh using a private blockchain for the user.

12. The non-transitory processor-readable storage medium of claim 7, wherein the computer instructions, when executed by the one or more processors to generate the distributed social mesh, cause the one or more processors to perform further actions, the further actions comprising:
establishing a smart contract between the user and at least one other user to enable the at least one other user to access the distributed social mesh of the user.

13. A computing system, comprising:
at least one memory that stores computer instructions; and
at least one processor that, when executing the computer instructions, cause the computing system to:
receive a request from a user to generate a distributed social mesh for the user;
in response to receiving the request:
generate the distributed social mesh for the user;
provide an initial token to the user; and
enable the user to exchange the token with at least one other entity;
receive an activity with the distributed social mesh by a second user;
generate another token for the second user based on the activity with the distributed social mesh; and
enable the second user to exchange the token with the at least one other entity.

14. The computing system of claim 13, wherein the at least one processor, when executing the computer instructions, further cause the computing system to:
provide at least one other token to the user in response to the user accessing the distributed social mesh.

15. The computing system of claim 13, wherein the at least one processor, when executing the computer instructions, further cause the computing system to:
provide at least one other token to the user in response to the user adding content to the distributed social mesh.

16. The computing system of claim 13, wherein the at least one processor, when executing the computer instructions, further cause the computing system to:
determine that the user has added content to the distributed social mesh;
determine a size of the content added to the distributed social mesh by the user;
select an amount of tokens to provide the user based on the size of the content; and
provide the selected amount of tokens to the user.

17. The computing system of claim 13, wherein the at least one processor, when executing the computer instructions, further cause the computing system to:
provide at least one other token to the user in response to the user accessing content of another distributed social mesh of another user.

* * * * *